US012585957B2

(12) United States Patent
Sastry et al.

(10) Patent No.: US 12,585,957 B2
(45) Date of Patent: Mar. 24, 2026

(54) SYSTEM AND METHOD FOR EFFICIENT ESTIMATION OF CUMULATIVE DISTRIBUTION FUNCTION

(71) Applicant: ROYAL BANK OF CANADA, Toronto (CA)

(72) Inventors: Chandramouli Shama Sastry, Halifax (CA); Alexander Radomir Branislav Radovic, Toronto (CA); Marcus Anthony Brubaker, Toronto (CA); Andreas Steffen Michael Lehrmann, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 664 days.

(21) Appl. No.: 17/954,059

(22) Filed: Sep. 27, 2022

(65) Prior Publication Data

US 2023/0100213 A1 Mar. 30, 2023

Related U.S. Application Data

(60) Provisional application No. 63/303,742, filed on Jan. 27, 2022, provisional application No. 63/248,843, filed on Sep. 27, 2021.

(51) Int. Cl.
*G06N 3/09* (2023.01)
*G06N 7/01* (2023.01)

(52) U.S. Cl.
CPC ................ *G06N 3/09* (2023.01); *G06N 7/01* (2023.01)

(58) Field of Classification Search
CPC .................................. G06N 3/09; G06N 7/01
See application file for complete search history.

(56) References Cited

U.S. PATENT DOCUMENTS 9,355,062 B2 * 5/2016 Marshall ................ A62C 37/50
9,702,702 B1 * 7/2017 Lane ........................ G06T 7/215
(Continued)

OTHER PUBLICATIONS

[Abdar et al.(2021) Abdar, Pourpanah, Hussain, Rezazadegan, Liu, Ghavamzadeh, Fieguth, Cao, Khosravi, Acharya, Makarenkov, and Nahavandi] Moloud Abdar, Farhad Pourpanah, Sadiq Hussain, Dana Rezazadegan, Li Liu, Mohammad Ghavamzadeh, Paul W. Fieguth, Xiaochun Cao, Abbas Khosravi, U. Rajendra Acharya, Vladimir Makarenkov, and Saeid Nahavandi. A Review of Uncertainty Quantification in Deep Learning: Techniques, Applications and Challenges. Inf. Fusion, 2021.
(Continued)

*Primary Examiner* — David E Choi
(74) *Attorney, Agent, or Firm* — NORTON ROSE FULBRIGHT CANADA LLP

(57) ABSTRACT

A computer-implemented system and method for estimating a Cumulative Distribution Function (CDF) are provided. The method includes: receive input data representing a volume V of a target space indicating a future target event; compute, using the trained neural network, an estimation of a first flux through a boundary of the volume V; compute, using the trained neural network, an estimation of a second flux through a boundary of a volume W of a base space based on the estimation of the first flux through the boundary of the volume V; generate, using the trained neural network, an estimation of a CDF for the volume V based on the second flux through the boundary of the volume W; compute a probability for the future target event based on the estimated CDF for the volume V; and generate a control command based on the probability for the future target event.

20 Claims, 23 Drawing Sheets

(56)           References Cited

U.S. PATENT DOCUMENTS

| | | | | |
|---|---|---|---|---|
| 10,578,413 B1 * | 3/2020 | Burke | ..................... | F42B 12/74 |
| 11,322,248 B2 * | 5/2022 | Grantcharov | ........... | G06F 17/40 |
| 2011/0163034 A1 * | 7/2011 | Castellarnau | ....... | A61M 1/1609 |
| | | | | 210/646 |
| 2017/0068861 A1 * | 3/2017 | Miller | .................... | G06V 20/52 |
| 2020/0058407 A1 * | 2/2020 | Balaban | ................. | G16H 20/00 |
| 2023/0100213 A1 * | 3/2023 | Sastry | ..................... | G06N 7/01 |
| | | | | 706/17 |

OTHER PUBLICATIONS

[Richardson et al.(1997) Richardson, Boudoukh, and Whitelaw] Matthew Richardson, Jacob Boudoukh, and Robert F. Whitelaw. The Best of Both Worlds: A Hybrid Approach to Calculating Value at Risk, 1997.
[Botev l'Ecuyer(2015) Botev and l'Ecuyer] Zdravko | Botev and Pierre l'Ecuyer. Efficient Probability Estimation and Simulation of the Truncated Multivariate Student-t Distribution. Winter Simulation Conference (WSC), 2015.
[Botev(2017)] Zdravko | Botev. The Normal Law Under Linear Restrictions: Simulation and Estimation via Minimax Tilting. Journal of the Royal Statistical Society, 2017.
[Chilinski Silva(2020) Chilinski and Silva] Pawel M. Chilinski and Ricardo Silva. Neural Likelihoods via Cumulative Distribution Functions. UAI, 2020.
[Cundy Ermon(2020) Cundy and Ermon] Chris Cundy and Stefano Ermon. Flexible Approximate Inference via Stratified Normalizing Flows. UAI, 2020.
[Cunningham et~al.(2013) Cunningham, Hennig, and Lacoste-Julien] John P. Cunningham, Philipp Hennig, and Simon Lacoste-Julien. Gaussian Probabilities and Expectation Propagation. JMLR, 2013.
[Dai Seljak(2021) Dai and Seljak] Biwei Dai and Uros Seljak. Sliced Iterative Normalizing Flows. ICML Workshop on Invertible Neural Networks, Normalizing Flows, and Explicit Likelihood Models, 2021.
[Press et al.(1988)Press, Teukolsky, Vetterling, and Flannery] William H Press, Saul A Teukolsky, William T Vetterling, and Brian P Flannery. Numerical Recipes in C. Cambridge University Press, 1988.[.
[Evans(2010)] Lawrence C Evans. Partial Differential Equations. Graduate Studies in Mathematics, 2010.
[Papamakarios et al.(2021) Papamakarios, Nalisnick, Rezende, Mohamed, and Lakshminarayanan] George Papamakarios, Eric Nalisnick, Danilo Jimenez Rezende, Shakir Mohamed, and Balaji Lakshminarayanan. Normalizing Flows for Probabilistic Modeling and Inference. JMLR, 2021.
[Grathwohl et al.(2019) Grathwohl, Chen, Bettencourt, Sutskever, and Duvenaud] Will Grathwohl, Ricky T. Q. Chen, Jesse Bettencourt, Ilya Sutskever, and David Duvenaud. FFJORD: Free-Form Continuous Dynamics for Scalable Reversible Generative Models. ICLR, 2019.

[Kingma Dhariwal(2018) Kingma and Dhariwal] Diederik P. Kingma and Prafulla Dhariwal. Glow: Generative Flow with Invertible 1x1 Convolutions. NeurIPS, 2018.
[Kobyzev et al.(2020)Kobyzev, Prince, and Brubaker] Ivan Kobyzev, Simon Prince, and Marcus Brubaker. Normalizing Flows: An Introduction and Review of Current Methods. PAMI, 2020.
[Ridgeway Mozer(2018)Ridgeway and Mozer] Karl Ridgeway and Michael C. Mozer. Learning Deep Disentangled Embeddings With the F-Statistic Loss. NeurIPS, 2018.
[Liang et al.(2020)Liang, Yang, Stoica, Abbeel, Duan, and Chen] Eric Liang, Zongheng Yang, Ion Stoica, Pieter Abbeel, Yan Duan, and Xi Chen. Variable Skipping for Autoregressive Range Density Estimation. ICML, 2020.
[Liu et al. (2019) Liu, Paisley, Kioumourtzoglou, and Coull] Jeremiah Z. Liu, John W. Paisley, Marianthi-Anna Kioumourtzoglou, and Brent A. Coull. Accurate Uncertainty Estimation and Decomposition in Ensemble Learning. NeurIPS, 2019.
[Mazaheri et al.(2020)Mazaheri, Jain, and Bruck] Bijan Mazaheri, Siddharth Jain, and Jehoshua Bruck. Robust Correction of Sampling Bias using Cumulative Distribution Functions. NeurIPS, 2020.
[Mehta et al.(2012)Mehta, Neukirchen, Pfetsch, and Poppensieker] Amit Mehta, Max Neukirchen, Sonja Pfetsch, and Thomas Poppensieker. Managing Market Risk: Today and Tomorrow, 2012.
[Sun et al.(2021) Sun, Lee, and Lee] Wei-Fang Sun, Cheng-Kuang Lee, and Chun-Yi Lee. DFAC Framework: Factorizing the Value Function via Quantile Mixture for Multi-Agent Distributional Q-Learning. ICML, 2021.
[Minka(2001)] Thomas P. Minka. Expectation Propagation for Approximate Bayesian Inference. UAI, 2001.
[Papamakarios et al.(2017) Papamakarios, Murray, and Pavlakou] George Papamakarios, Iain Murray, and Theo Pavlakou. Masked Autoregressive Flow for Density Estimation. NeurIPS, 2017.
[Genz Bretz(2009) Genz and Bretz] Alan Genz and Frank Bretz. Computation of Multivariate Normal and T Probabilities. Springer Science & Business Media, 2009.
Dua Graff(2017) Dua and Graff] Dheeru Dua and Casey Graff. UCI Machine Learning Repository, 2017. URL http://archive.ics.uci.edu/ml.
[Armstrong(2013)] Mark Anthony Armstrong. Basic Topology. Springer Science & Business Media, 2013.
[Lange(1999)] Kenneth Lange. Quadrature Methods. Numerical Analysis for Statisticians, 1999.
[Meneguzzo Vecchiato(2004)Meneguzzo and Vecchiato] Davide Meneguzzo and Walter Vecchiato. Copula Sensitivity in Collateralized Debt Obligations and Basket Default Swaps. Journal of Futures Markets: Futures, Options, and Other Derivative Products, 2004.
[Sklar(1959)] M Sklar. Fonctions de Répartition à n Dimensions et Leurs Marges. Publications de l'Institut Statistique de l'Université de Paris, 1959.
[Wade(2017)] William Wade. An Introduction to Analysis. Pearson, 2017.

* cited by examiner

600

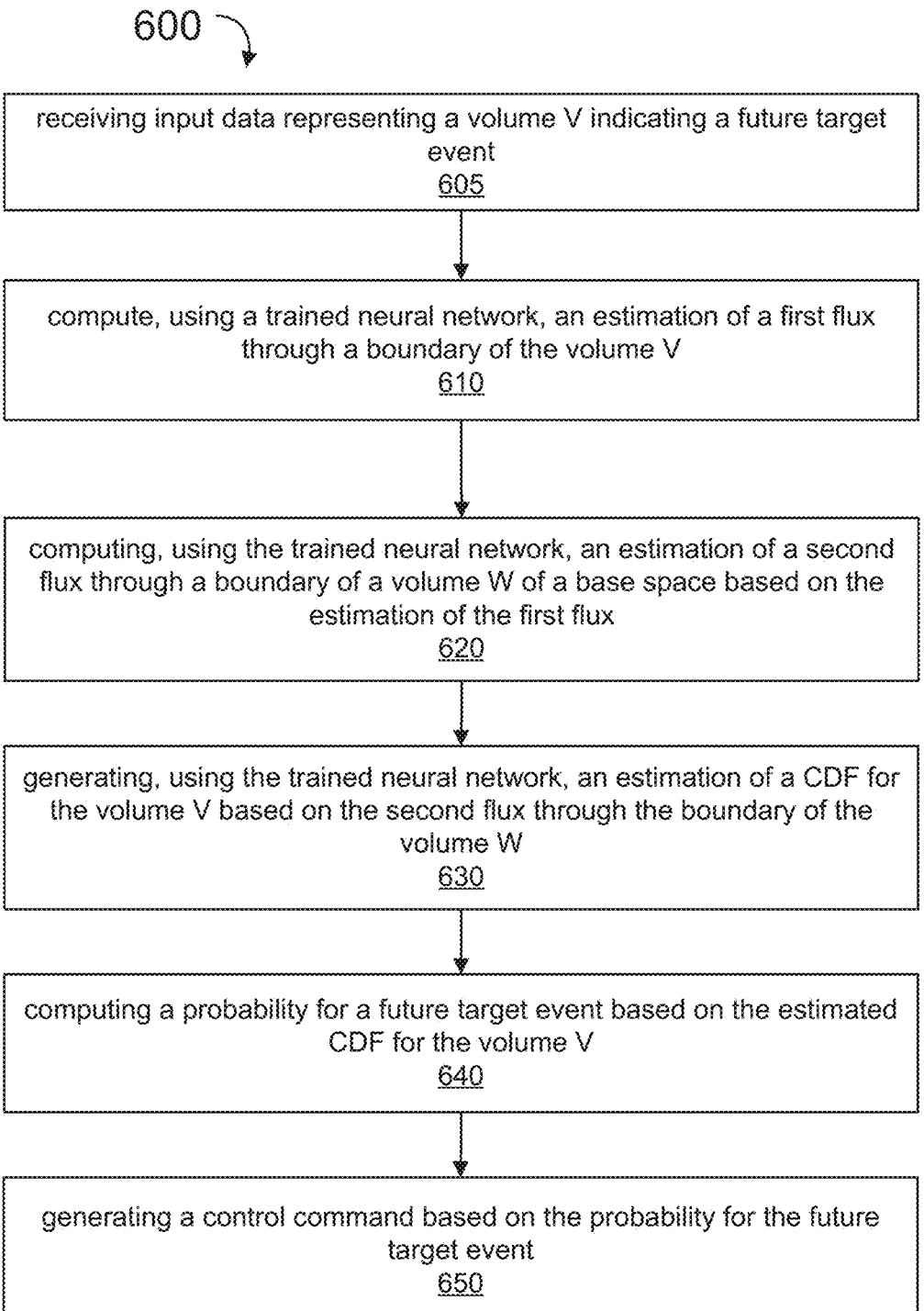

receiving input data representing a volume V indicating a future target event
605 compute, using a trained neural network, an estimation of a first flux through a boundary of the volume V
610 computing, using the trained neural network, an estimation of a second flux through a boundary of a volume W of a base space based on the estimation of the first flux
620 generating, using the trained neural network, an estimation of a CDF for the volume V based on the second flux through the boundary of the volume W
630 computing a probability for a future target event based on the estimated CDF for the volume V
640 generating a control command based on the probability for the future target event
650

FIG. 6

SYSTEM AND METHOD FOR EFFICIENT ESTIMATION OF CUMULATIVE DISTRIBUTION FUNCTION

CROSS-REFERENCE TO RELATED APPLICATIONS

This application claims the benefit of and priority to U.S. provisional patent application No. 63/248,843 filed Sep. 27, 2022, and U.S. provisional patent application no. 63/303, 742 filed Jan. 27, 2022, the entire content of each of which is herein incorporated by reference.

FIELD

The present disclosure generally relates to the field of computation of data distribution, and more particularly, to the field of using data distribution to predict probability of one or more target events.

BACKGROUND

Normalizing Flows [Kobyzev et al. (2020), Papamakarios et al. (2021)] are a form of generative model which constructs tractable probability distributions through invertible, differentiable transformations, i.e., diffeomorphisms. They admit both efficient and exact density evaluation and sampling and, as valid probability distributions, theoretically support a range of other probabilistic inference tasks. However, some inference tasks remain computationally challenging.

Cumulative densities are a fundamental statistical measure that estimates the probability of a sample in this range of values. Example applications are particularly common in the domain of uncertainty estimation [Liu et al. (2019), Mazaheri et al. (2020), Abdar et al. (2021)], and the evaluation of risk in financial settings [Richardson et al. (1997), Mehta et al. (2012)]. Other recent examples include distributional Reinforcement Learning [Sun et al. (2021)], few shot learning [Ridgeway Mozer (2018)], actuarial analysis in general, and alternative methods for training Normalizing Flows [Dai Seljak (2021)]).

Despite the importance of computing cumulative densities, current techniques for computing them with Normalizing Flows are restricted to traditional Monte-Carlo based estimators which, while unbiased, can have unbounded variance and poor computational efficiency. Further, such approaches fail to exploit the inherent structure of Normalizing Flows, namely their construction as a diffeomorphic transformation.

Normalizing Flows are density models (i.e. a distribution function) that can learn to accurately capture a variety of data distributions by learning an invertible transformation to a tractable base distribution; they enable tractable computation of point-likelihoods. Distributions are generally studied in terms of the probability density function, cumulative density function and moments such as the mean, variance and so on. Traditionally, exact cumulative densities are estimated through Monte Carlo based sampling methods, which while being unbiased can have unbounded variance and consequently have low sample-efficiencies and scale poorly with data dimensions. In general, density estimation estimation in the sense of "computing likelihoods" is possible with normalizing flows. Sampling-based estimation is only necessary for computing cumulative densities.

Normalizing Flows model a complex target distribution in terms of a bijective transform operating on a simple base distribution. As such, they enable tractable computation of a number of important statistical quantities, particularly likelihoods and samples. Despite these appealing properties, the computation of more complex inference tasks, such as the cumulative distribution function (CDF) over a complex region (e.g., a polytope) remains challenging. Traditional CDF approximations using Monte-Carlo techniques are unbiased but have unbounded variance, and low sample efficiency.

Normalizing Flows are explicit likelihood models with tractable distributions that enable efficient and exact density evaluation and sampling. As valid probability distributions, Normalizing Flows further theoretically support a range of probabilistic inference tasks and inverse problems. Further, recent work has connected Normalizing Flows to diffusion models [Song et al. (2020)], a SOTA approach for generative modeling, allowing trained diffusion models to be interpreted as a consistent continuous Normalizing Flow. However, not all inference problems currently have computationally efficient implementations.

SUMMARY

According to an aspect, there is provided a computer-implemented system for estimating a Cumulative Distribution Function (CDF). The system includes at least one processor and memory in communication with said at least one processor storing an CDF Estimator comprising a trained neural network and machine-readable instructions, wherein the instructions, when executed at said at least one processor, cause said system to: receive input data representing a volume V of a target space indicating a future target event; compute, using the trained neural network, an estimation of a first flux through a boundary of the volume V; compute, using the trained neural network, an estimation of a second flux through a boundary of a volume W of a base space based on the estimation of the first flux through the boundary of the volume V; generate, using the trained neural network, an estimation of a CDF for the volume V based on the second flux through the boundary of the volume W; compute a probability for the future target event based on the estimated CDF for the volume V; and generate a control command based on the probability for the future target event.

In some embodiments, the target event may include a peak event.

In some embodiments, the first flux is computed based on a normalizing flow represented by a vector field, through the boundary of the volume V.

In some embodiments, during training of the neural network, the instructions when executed at said at least one processor, cause said system to: receive, as training input, historical data representative of past target events and wherein the boundary of the volume V of the target space is defined based in part on the historical data.

In some embodiments, during training of the neural network, the instructions when executed at said at least one processor, cause said system to: use a model fitting process to generate a Probability Distribution Function (PDF) based on the historical data.

In some embodiments, during the training of the neural network, one or more weights of the neural network are iteratively updated to improve the estimation of the CDF by selecting points on the boundary of the volume V.

In some embodiments, the CDF for the volume V is based on a flux through the transformed boundary of the volume V in the base space.

For example, the second flux may be computed based on the flux through the transformed boundary of the volume V in the base space.

In some embodiments, the estimation the CDF for the volume V is based on a flux through the untransformed boundary of the volume V in the target space.

For example, the first flux may be computed based on the flux through the untransformed boundary of the volume V in the target space.

In some embodiments, the base space and the target space is related based on a relationship defined by:

$$P_{xr}(xr) = P_{yr}(yr) \left| \det \frac{dT}{dxr} \right|$$

where xr represents a variable in the target space for which the estimation of the CDF for the volume V is generated, $P_{xr}$ represents the PDF in the target space for xr, yr represents a variable in the base space with a prior data distribution represented by a tractable PDF $P_{yr}$, and T represents a flow transform to uniform density.

In some embodiments, the PDF $P_{yr}$ comprises a Gaussian distribution.

In some embodiments, the PDF $P_{yr}$ comprises a uniform distribution.

In some embodiments, $$P(x \in V) = \int_V p_X(x) dx,$$

wherein $P(x \in V)$ is a cumulative density over the volume V, and x represents a random variable with the complex target distribution $p_X(x)$.

In some embodiments, $$p_X(x) = p_Y(y) \operatorname{abs}\left( \left| \frac{dg}{dx} \right| \right),$$

wherein: |·| is a determinant, abs(·) denotes absolute value, g is inverse of f, $$\frac{dg}{dx}$$

is (d×d)—Jacobian J of g, x represents the random variable with the complex target distribution $p_X(x)$ using a bijective mapping f: $\mathbb{R}^d \to \mathbb{R}^d$, y is a random variable with a base distribution $p_Y(y)$.

In some embodiments, wherein $p_Y(y)$ comprises a Gaussian distribution.

In some embodiments, wherein $p_Y(y)$ comprises a uniform distribution.

In accordance with one aspect, there is provided a computer-implemented method for estimating a Cumulative Distribution Function (CDF). The method may include: receiving input data representing a volume V of a target space indicating a future target event; computing, using a trained neural network, an estimation of a first flux through a boundary of the volume V; computing, using the trained neural network, an estimation of a second flux through a boundary of a volume W of a base space based on the estimation of the first flux through the boundary of the volume V; generating, using the trained neural network, an estimation of a CDF for the volume V based on the second flux through the boundary of the volume W; computing a probability for the future target event based on the estimated CDF for the volume V; and generating a control command based on the probability for the future target event.

In some embodiments, the target event may include a peak event.

In some embodiments, the first flux is computed based on a normalizing flow represented by a vector field, through the boundary of the volume V.

In some embodiments, during training of the neural network, historical data representative of past target events are received as training input, and the boundary of the volume V of the target space is defined based in part on the historical data.

In some embodiments, during training of the neural network, the instructions when executed at said at least one processor, cause said system to: use a model fitting process to generate a Probability Distribution Function (PDF) based on the historical data.

In some embodiments, during the training of the neural network, one or more weights of the neural network are iteratively updated to improve the estimation of the CDF by selecting points on the boundary of the volume V.

In some embodiments, the CDF for the volume V is based on a flux through the transformed boundary of the volume V in the base space.

For example, the second flux may be computed based on the flux through the transformed boundary of the volume V in the base space.

In some embodiments, the estimation the CDF for the volume V is based on a flux through the untransformed boundary of the volume V in the target space.

For example, the first flux may be computed based on the flux through the untransformed boundary of the volume V in the target space.

In some embodiments, the base space and the target space is related based on a relationship defined by:

$$P_{xr}(xr) = P_{yr}(yr) \left| \det \frac{dT}{dxr} \right|$$

where xr represents a variable in the target space for which the estimation of the CDF for the volume V is generated, $P_{xr}$ represents the PDF in the target space for xr, yr represents a variable in the base space with a prior data distribution represented by a tractable PDF $P_{yr}$, and T represents a flow transform to uniform density.

In some embodiments, the PDF $P_{yr}$ comprises a Gaussian distribution.

In some embodiments, the PDF $P_{yr}$ comprises a uniform distribution.

In some embodiments, $$P(x \in V) = \int_V p_X(x) dx,$$

wherein $P(x \in V)$ is a cumulative density over the volume V, and x represents a random variable with the complex target distribution $p_X(x)$.

In some embodiments, $$p_X(x) = p_Y(y) \operatorname{abs}\left( \left| \frac{dg}{dx} \right| \right),$$

wherein: |·| is a determinant, abs(·) denotes absolute value, g is inverse of f, $$\frac{dg}{dx}$$

is (d×d)—Jacobian J of g, x represents the random variable with the complex target distribution $p_X(x)$ using a bijective mapping f: $\mathbb{R}^d \to \mathbb{R}^d$, y is a random variable with a base distribution $p_Y(y)$.

In some embodiments, wherein $p_Y(y)$ comprises a Gaussian distribution.

In some embodiments, wherein $p_Y(y)$ comprises a uniform distribution.

In accordance with yet another aspect, there is provided a non-transitory computer-readable storage medium storing an CDF Estimator and instructions that when executed, causes the a computer processor to: receive input data representing a volume V of a target space indicating a future target event; compute, using the trained neural network, an estimation of a first flux through a boundary of the volume V; compute, using the trained neural network, an estimation of a second flux through a boundary of a volume W of a base space based on the estimation of the first flux through the boundary of the volume V; generate, using the trained neural network, an estimation of a CDF for the volume V based on the second flux through the boundary of the volume W; compute a probability for the future target event based on the estimated CDF for the volume V; and generate a control command based on the probability for the future target event.

In some embodiments, the target event may include a peak event.

In some embodiments, the first flux is computed based on a normalizing flow represented by a vector field, through the boundary of the volume V.

In some embodiments, during training of the neural network, historical data representative of past target events are received as training input, and the boundary of the volume V of the target space is defined based in part on the historical data.

In some embodiments, during training of the neural network, the instructions when executed at said at least one processor, cause said system to: use a model fitting process to generate a Probability Distribution Function (PDF) based on the historical data.

In some embodiments, during the training of the neural network, one or more weights of the neural network are iteratively updated to improve the estimation of the CDF by selecting points on the boundary of the volume V.

In some embodiments, the CDF for the volume V is based on a flux through the transformed boundary of the volume V in the base space.

For example, the second flux may be computed based on the flux through the transformed boundary of the volume V in the base space.

In some embodiments, the estimation the CDF for the volume V is based on a flux through the untransformed boundary of the volume V in the target space.

For example, the first flux may be computed based on the flux through the untransformed boundary of the volume V in the target space.

In some embodiments, the base space and the target space is related based on a relationship defined by:

$$P_{xr}(xr) = P_{yr}(yr)\left|\det\frac{dT}{dxr}\right|$$

where xr represents a variable in the target space for which the estimation of the CDF for the volume V is generated, $P_{xr}$ represents the PDF in the target space for xr, yr represents a variable in the base space with a prior data distribution represented by a tractable PDF $P_{yr}$, and T represents a flow transform to uniform density.

In some embodiments, the PDF $P_{yr}$ comprises a Gaussian distribution.

In some embodiments, the PDF $P_{yr}$ comprises a uniform distribution.

In some embodiments, $$P(x \in V) = \int_V p_X(x)dx,$$

wherein $P(x \in V)$ is a cumulative density over the volume V, and x represents a random variable with the complex target distribution $p_X(x)$.

In some embodiments, $$p_X(x) = p_Y(y)\,\mathrm{abs}\left(\left|\frac{dg}{dx}\right|\right),$$

wherein: $|\cdot|$ is a determinant, abs($\cdot$) denotes absolute value, g is inverse of f, $$\frac{dg}{dx}$$

is (d×d)—Jacobian J of g, x represents the random variable with the complex target distribution $p_X(x)$ using a bijective mapping f: $\mathbb{R}^d \to \mathbb{R}^d$, y is a random variable with a base distribution $p_Y(y)$.

In some embodiments, wherein $p_Y(y)$ comprises a Gaussian distribution.

In some embodiments, wherein $p_Y(y)$ comprises a uniform distribution.

Other features will become apparent from the drawings in conjunction with the following description.

BRIEF DESCRIPTION OF DRAWINGS

In the figures which illustrate example embodiments,

FIG. 6 shows an example process performed by the system in FIG. 1, in accordance with an embodiment.

Figure 1:
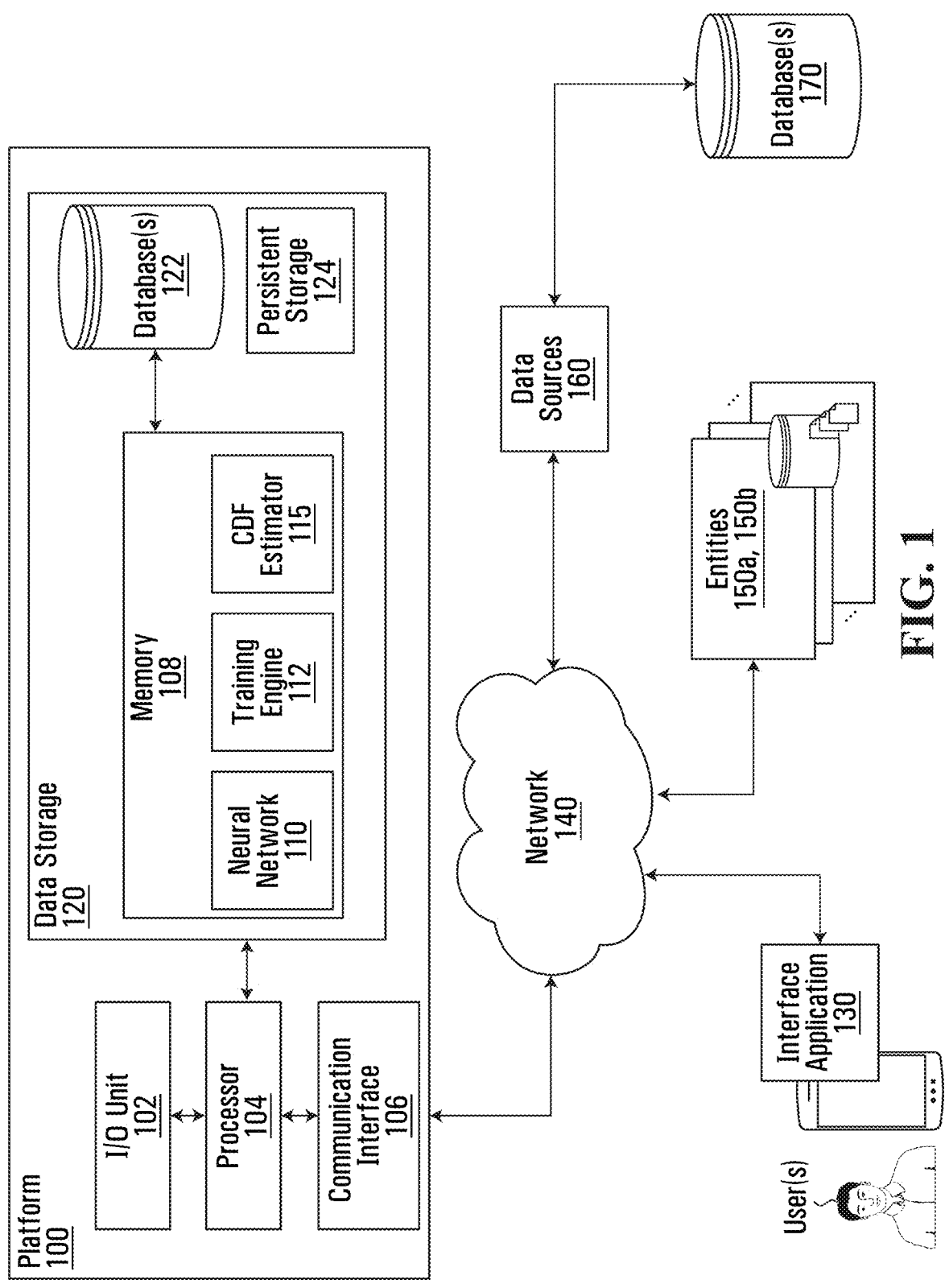
FIG. 1 is an example schematic diagram of a computer system for a CDF Estimator, in accordance with an embodiment.

Estimator, as compared to Monte-Carlo (MC) and Importance Sampling (IS) estimators.

FIGS. 8A, 8B, 8C, and 8D each illustrates log-likelihood on discrete flows, for 2D, 3D, 4D and 5D cases, respectively.

FIGS. 9A, 9B, 9C, and 9D each illustrates log-likelihood on continuous flows, for 2D, 3D, 4D and 5D cases, respectively.

FIGS. 10A, 10B, 10C, and 10D each illustrates a visual summary of all quantitative evaluations based on varying flow architectures.

DETAILED DESCRIPTION

In practical applications, cumulative density or range density estimation is useful anywhere a probability of a range of possible outcomes needs to be computed. For example, risk estimation models for financial markets often rely on cumulative density or range density estimation. One important component of modern portfolio construction is risk estimation, most often formulated as the value at risk summary statistic. A question that may be addressed by CDF estimation is at what percentage of time a clinical patient might experience a blood sugar peak event. Value at risk estimates are can be seen as a problem of CDF estimation, which is prohibitively expensive to calculate. Current approaches either rely on extensive Monte Carlo sampling based on market simulations, or on faster (but much cruder) estimates based on simple weighted combinations of historical returns. The CDF Estimator system described in this disclosure may be implemented as part of a market prediction model to efficiently and accurately estimate risk for multi-dimensional cases, e.g., risk estimation in the return of a portfolio of stocks.

As mentioned, exact cumulative densities may be estimated through Monte Carlo based sampling methods, which while being unbiased can have unbounded variance and consequently have low sample-efficiencies and scale poorly with data dimensions. Normalizing Flows [Kobyzev et al., (2020); Papamakarios et al., (2021)] are explicit likelihood models with tractable distributions that enable efficient and exact density evaluation and sampling. As valid probability distributions, Normalizing Flows theoretically support a range of probabilistic inference tasks and inverse problems. Further, recent work has connected Normalizing Flows to diffusion models [Song et al., (2020)], a SOTA approach for generative modeling, allowing trained diffusion models to be interpreted as a consistent continuous Normalizing Flow. However, not all inference problems currently have computationally efficient implementations.

In this disclosure, the task of inferring cumulative densities over arbitrary closed regions is learned by machine learning algorithm based on normalizing flows. There are a number of different extensions of the traditional one-dimensional definition of a Cumulative Distribution Function (CDF) to higher dimensions. In the embodiments, the system is configured to define the CDF in higher dimensions as an integral over a closed region. Example applications are in the domain of uncertainty estimation [Liu et al. (2019), Mazaheri et al. (2020), Abdar et al. (2021)], and include evaluations of risk in the stock market [(Richardson et al. (1997), Mehta et al. (2012)]. Other recent examples include distributional Reinforcement Learning [Sun et al. (2021)], few shot learning [Ridgeway Mozer (2018)], and alternative methods for training Normalizing Flows [Dai Seljak (2021)]. Despite this, the popular (and only) techniques for estimating CDFs in Normalizing Flows are traditional Monte-Carlo based estimators which while being unbiased can have unbounded variance and low sample-efficiency.

The disclosed embodiments herein describe a computer system and method for computing cumulative densities over a region of interes, which is not as easily computable as the probability density function. Computing cumulative densities are challenging even for distributions whose density functions have a closed form expression. By building upon the diffeomorphic properties of flows and a divergence theorem that efficiently estimates cumulative densities over a specified region, the embodiments are configured to generate an efficient estimation of a CDF by taking as input a boundary of the said region (e.g., a target space).

The CDF Estimator disclosed in this disclosure is an improvement over the traditional estimators, including the Monte-Carlo based estimator, as the disclosed CDF Estimator is computationally more efficient, and can reach the same level of accuracy with fewer samples.

Practical Applications of Example Embodiments

Efficient estimation of CDF over a region may be implemented to predict target events, such as events that happen rarely but tend to have a significant impact ("peak event"), which may occur in a number of practical scenarios as elaborated below. The CDF estimation is an efficient risk control tool when properly implemented.

A peak event may be defined by the cumulative density of a volume above a specified peak value.

More generally, the cumulative density in any closed region of the volume (in 1D corresponding to an interval) could be of interest depending on the practical application.

During training of a CDF estimator, which may include a neural network, training input data may include historical data including a number of features corresponding to one or more events for a specific use case or practical application. The input data used for the training phase can cover the entire distribution of a PDF, not just limited to target or peak events. Once trained, the CDF Estimator receives new queries not previously seen, and may determine a probability of one or more target events as part of the inference process at deployment, based on input data representing a volume V, where the volume V may indicate a target event. A target event may be a peak event.

Generally speaking, efficient CDF estimation in the embodiments generates a probability that a random variable deviates by a given amount from its expectation. which is also referred to as a tail probability. The traditional method of generating such a tail probability is to draw many samples and compute the probability based on the many samples. The CDF estimation system described in the present disclosure is more computationtional efficient, saves computing resources as it needs less samples, and thereby requires less computational resources such as CPU resource or time.

In some embodiments, a system or platform 100 may be implemented to monitor high risk events in a building. For example, a office tower may be a relatively closed space, and the distribution of conditioned air may be the primary means of heating and cooling the commercial building. Proper airflow measurement and control within the building are important for the health and comfort of the building occupants. Accurate and reliable airflow measurement allows the building's control system to work effectively, safely and efficiently.

In all of the practical embodiments and scenarios outlined below, during the training phase, historical measurements (e.g., airflow, power, glucose levels) are used by system 100 to train the CDF Esitmator to learn a PDF. At the inference stage after the CDF Estimator is properly trained, system 100 is configured to query the trained model by specifying a volume V (e.g., by specifying a target or peak event).

For instance, when the oxygen in the airflow decreases below a minimum threshold, the occupants in the building would start feeling faint or start suffocating. System 100 may be implemented to specifically estimate the risks of such an event by computing the probablility that the oxygen in the airflow, or the airflow itself, reaches below a certain threshold. System 100 may have access to a number of data sources 160, such as an airflow monitor and measurement sensor, compute a volume (e.g. volume V) representing a low airflow event, and generate the probability of a low airflow event for a future time period. The system 100 may generate an alarm signal once the probability of a low airflow event reaches a minimum threshold, e.g., 70%. The alarm signal may trigger a number of consequences, including for example, a visual and audio alarm to the occupants of the building if the event is predicted to happen within 24 hours, or a text message and an e-mail to the building's management team if the event is predicted to happen beyond 24 hours.

In some embodiments, a system or platform 100 may be implemented to monitor the probability of a power consumption peak event. System 100 may, during training of the CDF Estimator, receive input including historical peak events for the same area or neighbour area(s). At deployment, system 100 may, based on real-time input of continuous power consumption from each sub-area (e.g., city), use the trained CDF Estimator to compute a probability of a peak event, e.g., above a threshold of X megawatts (MW per day) for a given area. The threshold may be set to a specific number, such as, for example, 25,000 MW for a province or state. When the computed probability reaches the threshold, the system 100 may generate an alert or a control command to ensure that the peak event would not result in a power outage in the area.

In some embodiments, a system or platform 100 may be implemented to monitor the blood sugar level of a patient, which may be a diabetic patient. System 100 may, during training of the CDF Estimator, receive input representing factors affecting blood blood glucose level, which may include food or drink intake, medication intake, illness, sensor data from a temperature sensor, and so on, in order to train the neural network to learn about a PDF for one or more target events for the diabetic patient. At deployment, system 100 may, based on the distribution learned during the training phase, predict a blood sugar peak event. The peak event may be when the blood glucose level is too high or too low, or a possible fainting event. When the computed probability of the peak event reaches the threshold, the system 100 may generate an alert to the user(s), who may be the patient, a family member, a medical professional, or any combination thereof.

The disclosed embodiments herein build upon the diffeomorphic properties of Normalizing Flows and leverage the divergence theorem to estimate the CDF over a closed region in target space in terms of the flux across its boundary, as induced by the normalizing flow. Both deterministic and stochastic instances of this estimator ("CDF Estimator") are described: while the deterministic variant iteratively improves the estimate by strategically subdividing the boundary, the stochastic variant provides unbiased estimates. Experiments on popular flow architectures and UCI benchmark datasets show a marked improvement in sample efficiency as compared to traditional estimators.

In some embodiments, a CDF Estimator is implemented to efficiently estimate cumulative density in one or more closed regions, by taking the boundary of the region as input and exploiting the unique characteristics of Normalizing Flows. In some embodiments, the diffeomorphic property of normalizing flow transforms is used to relate the cumulative density in the target space to volume in the base space, and a divergence theorem is adapted for efficiently estimating cumulative densities over a region by only considering the boundary of the region in the target space. This technique can efficiently estimate the CDF as predicted by a normalizing flow, which may be trained by a training engine based on a machine learning model. The CDF Estimator is implemented to identify best-case performance scenarios and use that to describe an adaptive-estimator that can identify the points on boundary for iteratively improving the estimate. Although this technical framework, in theory, supports any arbitrary closed region, the disclosure focuses on polyhedral regions or convex hulls over which cumulative densities are computed.

In some embodiments, a novel formulation of the cumulative density of a normalizing flow is implemented by relating it to the volume in a (uniform) base space and the boundary integrals in both base and data space based on the divergence theorem. An unbiased, stochastic estimator for cumulative densities over a closed region can be implemented. This stochastic estimator can be used to build an adaptive, deterministic approximation for cumulative densities over a closed region by strategically adding points along the boundary of the region. A comprehensive evaluation protocol to evaluate CDF estimators for normalizing flows as a function of region sizes, architecture families and capacities is also described in this disclosure.

In some embodiments, a stochastic-unbiased estimator based on the divergence theorem for estimating cumulative densities over a given the boundary of closed region is implemented. The stochastic estimator is extended to build an adaptive estimator that iteratively improves the estimation by strategically acquiring points on the boundary. In addition, a comprehensive evaluation protocol that evaluates CDF estimators as a function of hull sizes, architecture families and capacities is provided in this disclosure. Computer codes that facilitates the training of popular Normalizing Flows and evaluates cumulative densities with the adaptive boundary estimator are implemented. The algorithm for handling simplicial complexes can be written in plain python for ease of use and maintenance.

Computing cumulative densities is not tractable in higher dimensions even for distributions such as the multivariate Gaussian which have closed-form density functions. Consequently, approximations to volume integrals/cumulative density functions has been an important research problem: for example, [Genz Bretz (2009)] discuss methods for approximating integrals over multivariate Gaussian and t-distributions. [Botev I'Ecuyer (2015)] and [Botev (2017)] propose a tilting method for I.I.D. sampling and approximating cumulative densities over convex polytopes in multivariate Gaussian and t-distributions respectively. Approximating integrals over one dimensional distributions is also challenging for certain distributions; see [Lange (1999)] for a discussion on quadrature methods and [Press et al. (1988)] for a discussion on numerical methods for estimating one dimensional integrals. [Cunningham et al. (2013)] extensively study Expectation-Propagation [Minka (2001)] as an approximation integration method for computing cumulative densities over polyhedral or hyperrectangular regions in Gaussian space. If a base space of a normalizing flow is assumed to be a Gaussian space, the techniques described in some example embodiments, discussed below, can be applied to the region in Gaussian space corresponding to the region V in the target space; however, it is not easy to ensure that polyhedral regions in target space remain polyhedral in base space without restricting the expressive power of the flow transform.

[Cundy Ermon (2020)] considers the general problem of estimating integrals and propose an approximate inference procedure that allows explicit control of the bias/variance tradeoff; the method involves first creating partitions of the base uniform space of the normalizing flow and then training a separate variational approximator for each partition. When one partition is used for the entire region, the algorithm reduces to the standard variational approximation resulting in a biased low-variance estimate. However, for a good estimate, the number of partitions have to be increased and the algorithm reduces to Monte Carlo sampling. Furthermore, it is not easy to determine the partitioning strategy to arrive at the exact estimate with as few samples as possible.

[Liang et al. (2020)] considers the problem of approximating range densities in a tabular database using autoregressive models. In order to efficiently marginalize over data-dimensions, they train the model by randomly masking some data dimensions which is referred to as variable-skipping. At inference time, they only need to sample the variables whose ranges are specified to form the estimate. Even though the training objective is indeed the maximum likelihood objective, the estimate obtained from the model trained with variable skipping is only an approximate value of the range densities. Introduced in [Sklar (1959)], copulas are multivariate cumulative density functions which can be used to define multivariate distributions in terms of their univariate marginals. The univariate marginals and the dependence between the variables are defined separately, allowing one to tractably compute multivariate axis-aligned CDFs. For example, [Chilinski Silva (2020)] suggest an alternative to normalizing flows based on copula theory wherein CDF estimates are available through a simple forward pass; nonetheless, this approach has some limitations—most notably, sampling from the learned distribution is not tractable. In contrast, the present disclosure focuses on computing CDFs over flexibly shaped regions with normalizing flows, a broad and flexible class of distributions.

A general computer system is described next in a CDF Estimator and a training engine 112 for a neural network 110 may be implemented for training. FIG. 1 is a high-level schematic diagram of an example computer-implemented system 100 for training a neural network 110, exemplary of embodiments. For example, one or more automated agents can be instantiated and trained by training engine 112, where each automated agent maintains and updates a respective neural network 110.

As detailed herein, in some embodiments, system 100 may include features adapting it to perform certain specialized purposes, e.g., as a training platform to train a neural network 110 to generate predictions or images based on a given set of feature data, which can also be images. In such embodiments, system 100 may be referred to as platform 100 for convenience.

In some embodiments, the CDF Estimator 115 may be configured to leverage a neural network 110, as trained by the training engine 112, to generate an estimation for a CDF for a region of interest, which may be referred to as a target space.

Referring now to the embodiment depicted in FIG. 1, platform 100 can include an I/O unit 102, a processor 104, communication interface 106, and data storage 120. The I/O unit 102 can enable the platform 100 to interconnect with one or more input devices, such as a keyboard, mouse, camera, touch screen and a microphone, and/or with one or more output devices such as a display screen and a speaker.

A processor 104 is configured to execute machine-executable instructions to train a neural network 110 through a training engine 112. The training engine 112 can be configured to generate signals based on one or more rewards or incentives, such as a loss function, to train the neural network 110 to perform tasks more optimally, e.g., to minimize and maximize certain performance metrics such as minimizing risk or a loss function. For example, the training engine 112 may be configured to perform and execute standard supervised learning, where the input to the training engine 112 may include feature data (e.g., images), predicted data (e.g., predicted images), and generated predictions (e.g., generated images).

The platform 100 can connect to an interface application 130 installed on user device to receive input data. Entities 150a, 150b can interact with the platform to receive output data and provide input data. The entities 150a, 150b can have at least one computing device. The platform 100 can train one or more neural networks 110. The trained neural networks 110 can be used by platform 100 or can be for transmission to entities 150a, 150b, in some embodiments. The platform 100 can, for example, process images using the neural network 110 in response to commands from entities 150a, 150b, in some embodiments.

The platform 100 can connect to different data sources 160 and databases 170 to receive input data and receive output data for storage. The input data can include feature data. Network 140 (or multiple networks) is capable of carrying data and can involve wired connections, wireless connections, or a combination thereof. Network 140 may involve different network communication technologies, standards and protocols, for example.

The processor 104 can execute instructions in memory 108 to implement aspects of processes described herein. The processor 104 can execute instructions in memory 108 to configure a data collection unit, interface unit (to provide control commands to interface application 130), neural network 110, training engine 112, and other functions described herein. The processor 104 can be, for example, any type of general-purpose microprocessor or microcontroller, a digital signal processing (DSP) processor, an integrated circuit, a field programmable gate array (FPGA), a reconfigurable processor, or any combination thereof.

Figure 2:
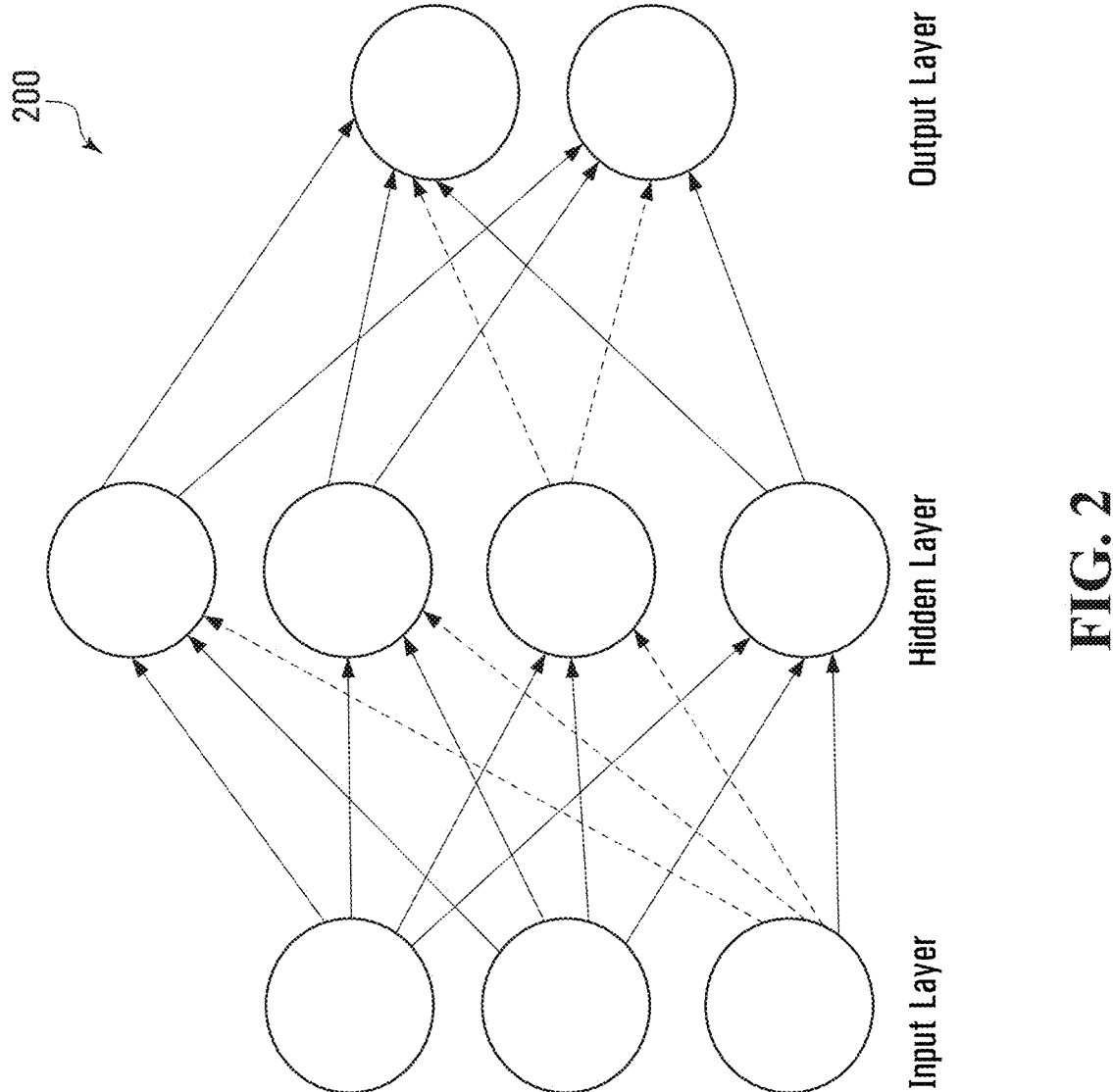
FIG. 2 is a schematic diagram of an example neural network maintained at the computer-implemented system of FIG. 1.

FIG. 2 is a schematic diagram of an example neural network 200 according to some embodiments. The example neural network 200 can include an input layer, a hidden layer, and an output layer. The neural network 200 processes input data using its layers based on weights, for example.

Referring again to FIG. 1, the interface application 130 interacts with the platform 100 to exchange data (including control commands) and generates visual elements for display at user device. The visual elements can represent neural networks 110 and output generated by neural networks 110.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 120 can include memory 108, databases 122, and persistent storage 124.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 may serve multiple users which may operate trade entities 150a, 150b.

The data storage 120 may be configured to store information associated with or created by the components in memory 108 and may also include machine executable instructions. The data storage 120 includes a persistent storage 124 which may involve various types of storage technologies, such as solid state drives, hard disk drives, flash memory, and may be stored in various formats, such as relational databases, non-relational databases, flat files, spreadsheets, extended markup files, etc.

Figure 3:
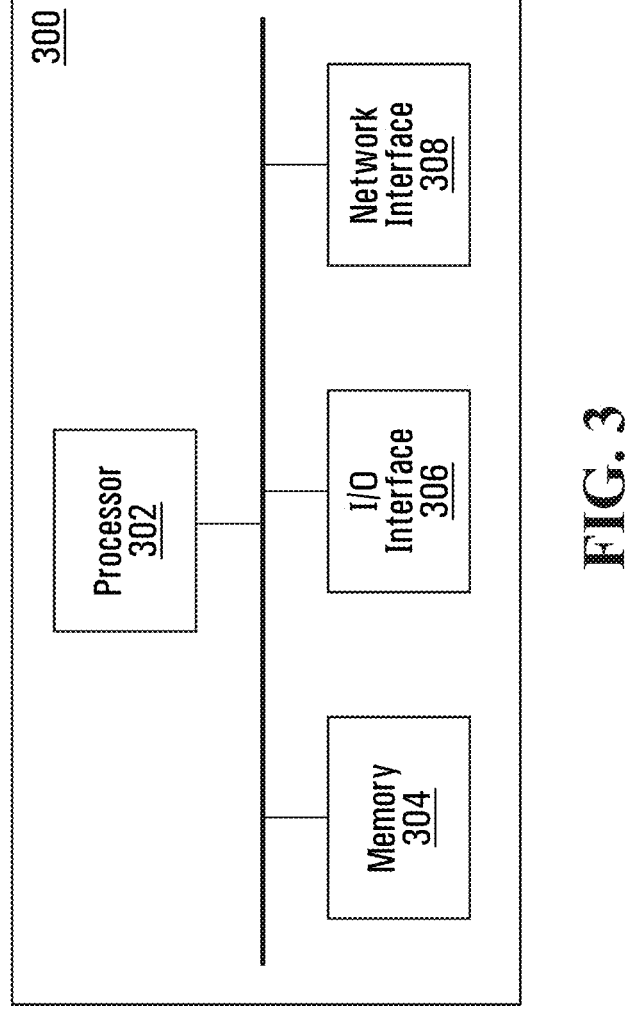
FIG. 3 is a schematic diagram of a computing device that implements a computer system for the CDF Estimator, in accordance with an embodiment.

FIG. 3 is a schematic diagram of another example computing device 300 that implements a system (e.g., the CDF Estimator 115 on platform 100), in accordance with an embodiment. As depicted, computing device 300 includes one or more processors 302, memory 304, one or more I/O interfaces 306, and, optionally, one or more network interfaces 308.

Each processor 302 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 304 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 304 may store code executable at processor 302, which causes training system to function in manners disclosed herein. Memory 304 includes a data storage. In some embodiments, the data storage includes a secure datastore. In some embodiments, the data storage stores received data sets, such as textual data, image data, or other types of data.

Each I/O interface 306 enables computing device 300 to interconnect with one or more input devices, such as a keyboard, mouse, camera, touch screen and a microphone, or with one or more output devices such as a display screen and a speaker.

Each network interface 308 enables computing device 300 to communicate with other components, to exchange data with other components, to access and connect to network resources, to serve applications, and perform other computing applications by connecting to a network such as network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system that includes multiple computing devices 300. The computing devices 300 may be the same or different types of devices.

Each computing devices may be connected in various ways including directly coupled, indirectly coupled via a network, and distributed over a wide geographic area and connected via a network (which may be referred to as "cloud computing").

For example, and without limitation, each computing device 300 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Example embodiments of the CDF Estimator 115 are discussed next. The following summarizes some variables and notations used in some embodiments:

| | |
|---|---|
| x | The variable in target space (i.e. data distribution) |
| y | The variable in base space (i.e. prior distribution with a tractable pdf function) |
| T | The flow transform to uniform density |
| V | The volume in target space, over which the CDF is to be computed |
| W | The volume in base space corresponding to the volume V |
| $P_x$ | PDF in target space |
| $P_y$ | PDF in base space |
| D | The dimensionality of the x |

Normalizing Flows

In some embodiments, normalizing flows transform a random variable Y with a simple base distribution $p_Y(y)$ into a random variable X with a complex target distribution $p_X(x)$ using a bijective mapping f: $\mathbb{R}^d \to \mathbb{R}^d$. Base and target space are connected by the change-of-variables formula $$p_X(x) = p_Y(y)\,\text{abs}\left(\left|\frac{dg}{dx}\right|\right),$$

where $|\cdot|$ is the determinant, abs($\cdot$) denotes absolute value, g is the inverse of f, and $$\frac{dg}{dx}$$

is the (d×d)—Jacobian J of g.

Set $Y \sim \mathcal{U}_{[0,1]^d}$, which has the important property $P(y \in W) = \text{vol}(W)$ for any compact set $W \subset [0,1]^d$, i.e., the cumulative density equals the enclosed volume, where $\mathcal{U}_S$ denotes the uniform distribution with support S. For pre-existing flows f' with non-uniform (e.g., Gaussian) base distribution $p_{Y'}(y')$, one can simply set $f := f'(F_{Y'}^{-1}(y))$ to align them with the case above. Sampling from a normalizing flow involves first sampling $y \sim p_Y$ and then applying the flow transform f to obtain $x = f(y)$.

In some embodiments, an objective may be: given a compact set of interest $V \subset \mathcal{U}^d$ in target space, perform efficient computation of $$P(x \in V) = \int_V p_X(x)dx. \tag{2}$$

where $P(x \in V)$ refers to the cumulative density over volume $V$; and $x \in R^D$ denotes the variable in the target space.

Monte-Carlo Estimation

If the volume $V$ admits a tractable membership function, $P(x \in V)$ can be estimated from N random samples from the model as the fraction of points falling into V; this method is referred to as the Monte-Carlo (MC) estimate. Similarly, if the volume $V$ admits a uniformly distributed random variable $U \sim \mathcal{U}_V$, one could estimate $P(x \in V)$ as $$\int_V p_X(x)dx = \int_V p_U(x) \cdot \frac{p_X(x)}{p_U(x)}dx = \mathbb{E}_{x \sim p_U}\left[\frac{p_X(x)}{p_U(x)}\right],$$

which can be referred to as the Importance Sampling (IS) estimate. While both of the described estimators are unbiased, they have unbounded variances for smaller sample sizes and may require several runs to obtain accurate results [Cunningham et al. (2013)].

In some embodiments, computing or estimating the CDF over a volume V in target space is equivalent to computing the CDF over the corresponding volume W in base space. This is useful if the base space is the uniform distribution as this allows computation of the CDF over the volume V by just computing the volume W. Transforming the base distribution to the uniform distribution is fairly straightforward owing to the tractable base distribution. Moreover, the diffeomorphic property of flows can be used to reliably estimate the boundary of W from the boundary of V, the volume of W can be computed by applying the divergence theorem, which connects surface integrals and volume integrals.

In some embodiments, computing or estimating the CDF over a volume V may be performed in three steps: first, leveraging the divergence theorem to relate $P(x \in V)$ to a flux through the transformed boundary $g(\partial V)$ of V in base space; second, introducing an equivalent flux—mathematically expressed as the surface integral of a given vector field and a measure of how much of the vector field passes through a closed surface —through the untransformed boundary $\partial V$ of V to enable direct integration in target space; finally, using an iterative protocol that enables fine-grained control over the quality of the approximation.

Figure 4A:
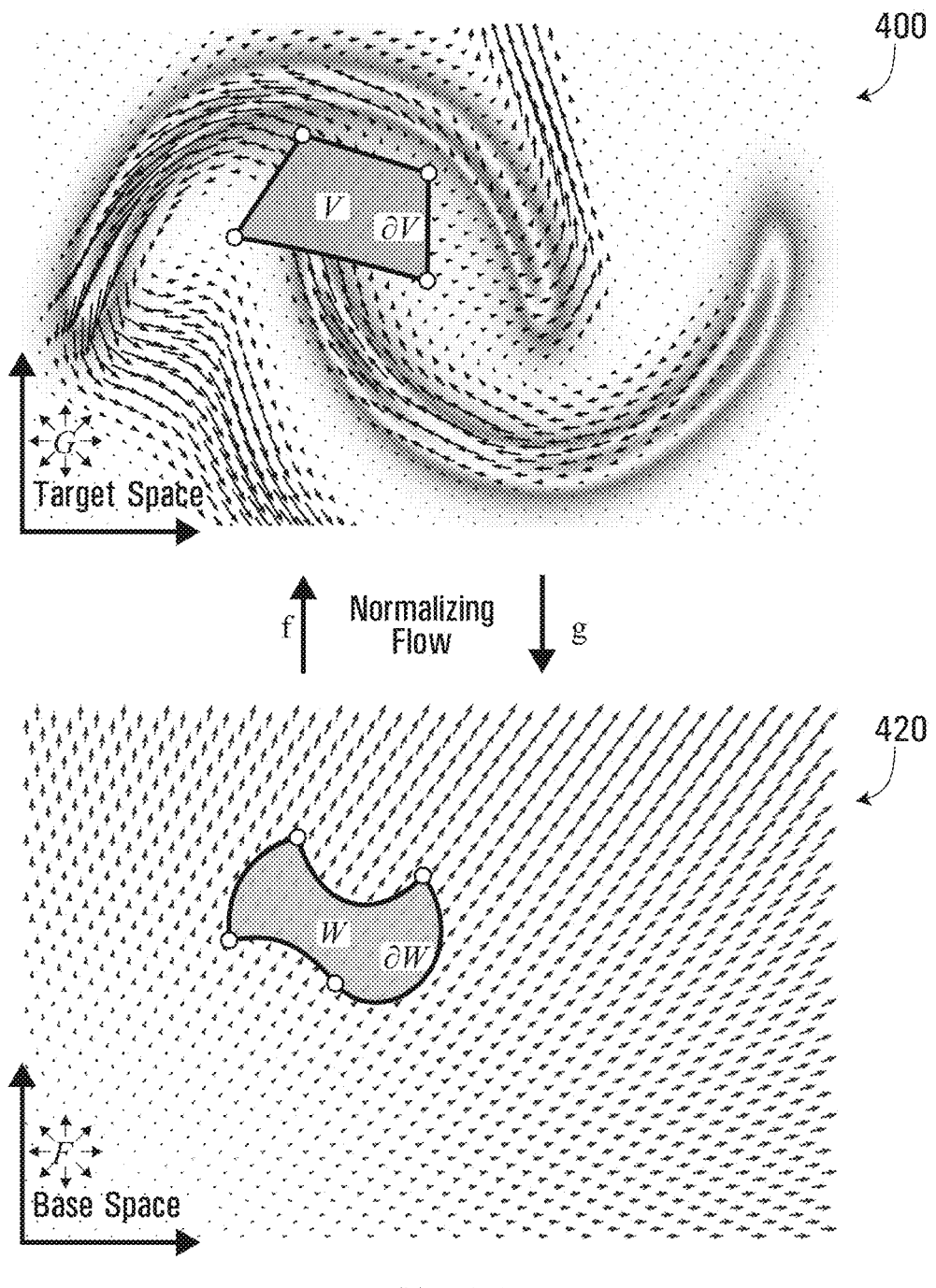
FIG. 4A illustrates a schematic of an example estimator to compute the cumulative density p induced by a normalizing flow f over a complex region V.

FIG. 4A shows a schematic of an efficient estimator to compute the cumulative density P induced by a normalizing flow f over a complex region V. It can be shown that P corresponds to integrating over the boundary $\partial W = g(\partial V)$ in a uniform base space 420 with respect to a vector field F with constant divergence 1, which can be expressed as an integration over the boundary $\partial V$ in the target space 400 with respect to an equivalent vector field G.

Cumulative Density as Boundary Flux

As shown below, computing the cumulative density over V in target space is equivalent to computing the volume of $W := g(V)$ in base space.

Lemma 1.

Let $V \subset \mathbb{R}^d$ be compact and $W := g(V)$. Then $P(x \in V) = \text{vol}(W)$.

Proof. Noting that $p(x) = p(y)\text{abs}\left(\left|\frac{dg}{dx}\right|\right)$ and $dy = \text{abs}\left(\left|\frac{dg}{dx}\right|\right)dx$, then: $\tag{3}$ -continued $$P(x \in V) = \int_V p(x)dx = \int_V p(y)\text{abs}\left(\left|\frac{dg}{dx}\right|\right)dx$$

$$= \int_W p(y)dy = \int_W dy = \text{vol}(W) - 1\text{mm}$$

The properties of W can be controlled through f.

Definition 1 (Diffeomorphism)

Let $T \subset \mathbb{R}^d$ be compact with piecewise smooth boundary $\partial T$. Given a vector field B, the volume integral of the divergence $\nabla \cdot B$ over T and the surface integral of B over $\partial T$ are related by $$\int_T (\nabla \cdot B)dT = \int_{\partial T} B \cdot n \, d(\partial T), \tag{4}$$

where n is the outward-facing unit normal.

Proof. [Wade (2017)]

Setting $A := \partial W$, an application of the divergence theorem using the vector field $$F(x) = \frac{x}{d} \text{ yields } \nabla \cdot F = 1$$

and thus $$\text{vol}(W) = \int_W dW = \int_W \nabla \cdot F \, dW = \int_A F \cdot n \, dA, \tag{5}$$

i.e., one can compute the volume of W in terms of a flux through the boundary of W. Note that F is not unique and other choices are possible. Consider that the closed region V is given by a simplicial polytope and note that a simplicial polytope can be constructed with arbitrary accuracy for any closed region of a d-dimensional space whose boundary is defined by a c<d-dimensional manifold. The boundary of such a polytope is defined by a set of (d−1)-simplices; for example, the boundary of a simplicial polytope in 2D is a set of 1-simplices (i.e., line segments). One can approximate the boundary A by flowing the vertices of the (d−1)-simplices defining the boundary of V through g.

Denoting the resulting set of simplices by $\{A_i\}_i$:

$$\text{vol}(W) \approx \sum_{A_i} F(A_i^{(c)}) \cdot A_i^{(n)}, \tag{6}$$

where $A_i$ is the i-th simplex, $A_i^{(c)}$ its centroid, and $A_i^{(n)}$ its outward-facing normal. The approximation error is rooted in the assumption that the true boundary patch in A corresponding to a transformed simplex $A_i$ is linear.

Figure 4B:
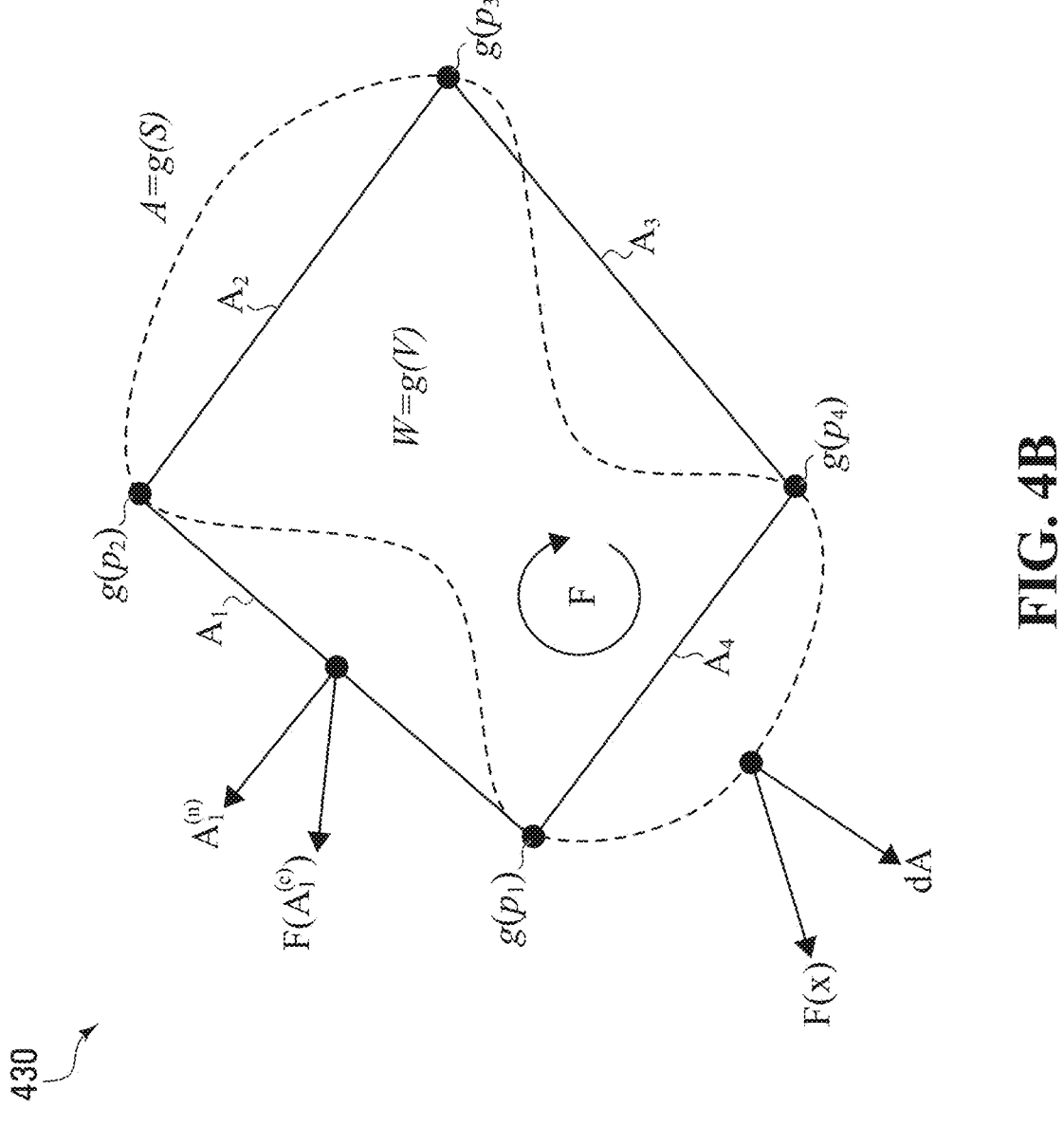
FIG. 4B illustrates a piecewise linear boundary S defined by points $\{p_i\}_i$ in target space has a complex shape A in base space.

The approximation error is rooted in the assumption that the boundary is linear between the vertices in the boundary S (see FIG. 4B).

The larger the set of simplices approximating the boundary A, the better the estimate. As this method requires first constructing the set of simplices in base space before applying the Divergence Theorem, the surface normals for every new set of simplices would need to be recomputed. In order to avoid that, Statement 2 below can be used to integrate directly over the boundary $\partial V$ in target space.

FIG. 4B illustrates a piecewise linear boundary S defined by points $\{p_i\}_i$ in target space has a complex shape A in base space 430. The cumulative density enclosed by S is equivalent to the boundary flux of F through A (Eq. (5)). As an approximation, one can instead compute the boundary flux of F through the piecewise linear boundary $\{A_i\}_i$ defined by $\{g(p_i)\}_i$ (Eq. (6)).

Stochastic Estimation in Target Space

One drawback of the method described in Eq. (6) is that it requires first constructing the set of simplices $\{A_i\}_i$ in base space before the divergence theorem can be applied. In particular, one would need to recompute the centroids $A_i^{(c)}$ and normals $A_i^{(n)}$ every time $\{A_i\}_i$ changes. Preferable is a direct integration over the boundary $S := \partial V$ in target space using an appropriate transformation of F.

Lemma 2.

Let dA and dS be the area vectors in base space and target space, respectively. Then $\int_A F \cdot dA = \int_S G \cdot dS$, with $G := |J| J^{-1} F$ and $J := \nabla g$.

Proof.

Consider a simplex with vertices $p_i$ (i=1,2, ..., d) in target space and its corresponding points $g(p_i)$ defining a simplex $\Delta A \in \{A_i\}_i$ in base space. g can be approximated with a Taylor expansion $$g(x+\epsilon) = g(x) + J\epsilon + O(\|\epsilon\|_2^2), \tag{7}$$

where J is the (d×d)—Jacobian at the centroid of the simplex (as the transformation g preserves input size). With $F = F(\Delta A^{(c)}) \in \mathbb{R}^d$ denoting the field at the centroid, $F \cdot \Delta A^{(n)}$ can be written as $$F \cdot \Delta A^{(n)} = \frac{1}{(d-1)!} \left\| \begin{bmatrix} F \\ J(p_2 - p_1) + 2O(\|\epsilon\|_2^2) \\ J(p_3 - p_1) + 2O(\|\epsilon\|_2^2) \\ \vdots \\ J(p_d - p_1) + 2O(\|\epsilon\|_2^2) \end{bmatrix} \right\|. \tag{8}$$

In the limit $\Delta A \to 0$, one can have $\Delta A^{(n)} \to dA$ and $\|\epsilon\|_2^2 \to 0$:

$$F \cdot dA = \frac{1}{(d-1)!} \left\| J \begin{bmatrix} J^{-1}F \\ p_2 - p_1 \\ p_3 - p_1 \\ \vdots \\ p_d - p_1 \end{bmatrix} \right\| = G \cdot dS, \tag{9}$$

where $G = |J| J^{-1} F$.

For notational convenience, assume $|J| > 0$ so that outward-facing surface normals in base space remain outward-facing in target space; the general case requires straightforward tracking of their signs. Interestingly, G has a tractable divergence, paving the way for an application of the divergence theorem in target space.

Lemma 3.

With G defined as in Lemma 2, $\nabla \cdot G = |J|$.

$$\begin{aligned} \nabla \cdot G &= \nabla \cdot (adj(J)F) \tag{10} \\ &= (\nabla \cdot adj(J))F + tr(adj(J)\nabla_x\{F\}) \\ \text{Proof.} \qquad &= d^{-1} tr(adj(J)J) + (\nabla \cdot adj(J))F \ , \\ &= |J| + (\nabla \cdot adj(J))F \\ &= |J| \end{aligned}$$

because $tr(adj(J)J) = d|J|$. Furthermore, [Evans (2010)] shows $\nabla \cdot adj(J) = 0$ for any $C^2$-map.

Lemma 3 closes the loop and tie the field G back to the original objective of computing $P(x \in V)$. Indeed, an application of Eq.(4) and Eq.(1) shows $$\int_S G \cdot dS = \int_V |J| dV = \int_V p(x) dV = P(x \in V). \tag{11}$$

FIG. 4A shows how the flux of a learned vector field G across the boundary $\partial V$ is related to vol(W), which can be expressed as the flux of a vector field F with $\nabla \cdot F = 1$ across the boundary $\partial W$—obtained by applying a learned transformation g.

Figure 4C:
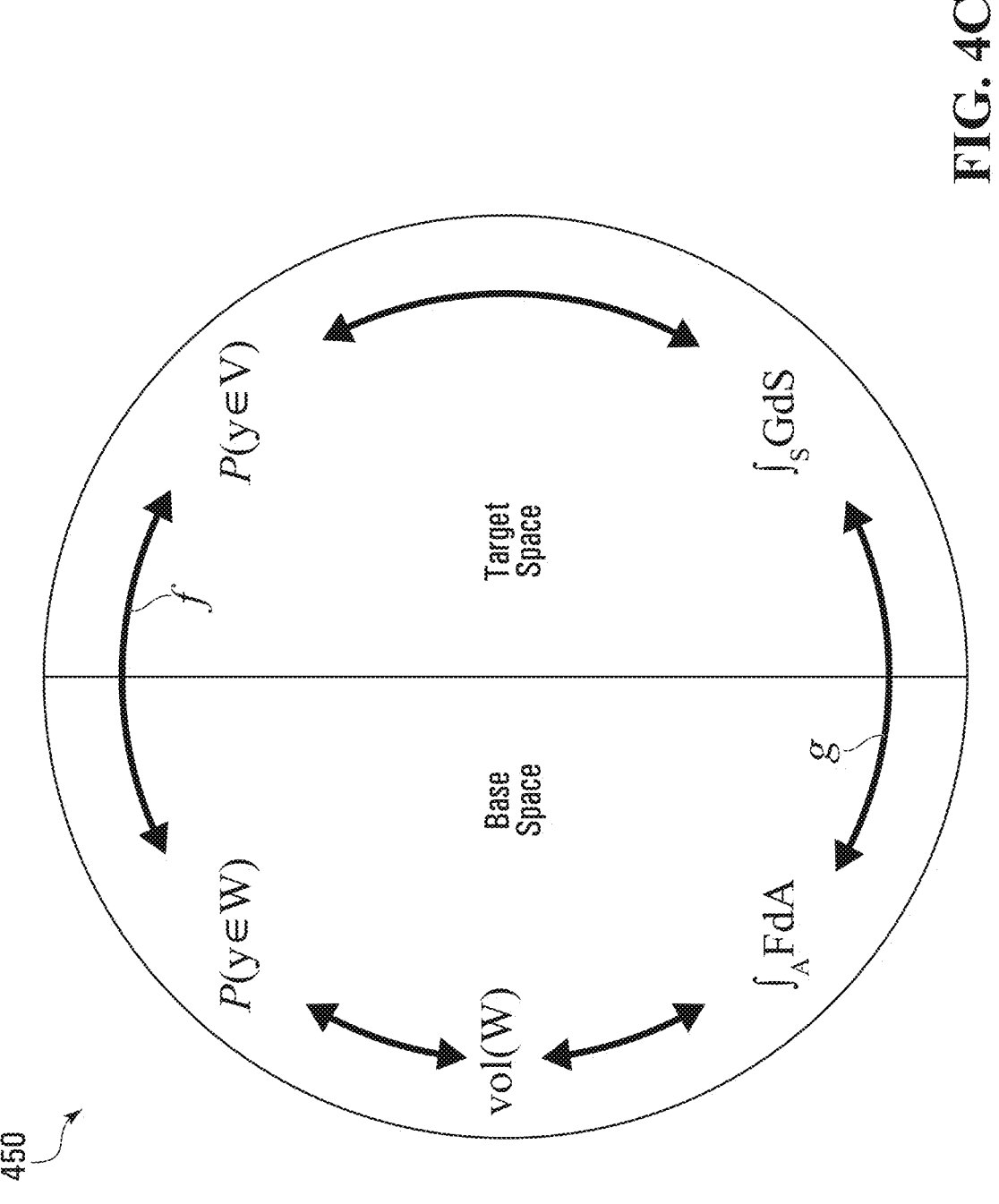
FIG. 4C shows equivalent expressions for the cumulative density of interest and their associated spaces.

FIG. 4C shows equivalent expressions for the cumulative density of interest $P(x \in V)$ and their associated spaces 450. The proposed estimator is motivated by a counter-clockwise chain of arguments, ultimately leveraging $\int_S G \ dS$.

Stochastic Boundary Flux Estimator

For a simplicial polytope V with boundary S given by non-overlapping simplices $\{S_i\}_i$, one can leverage G to define a stochastic boundary flux (BF-S) estimator of the cumulative density $P(x \in V)$ using points sampled from the boundary:

$$\begin{aligned} \int_S G \cdot dS &= \sum_i \int_{S_i} G(x) \cdot S_i^{(n)} dx = \sum_i S_i^{(A)} \int_{S_i} \frac{G(x)}{S_i^{(A)}} \cdot S_i^{(n)} dx \tag{12} \\ &= \sum_i S_i^{(A)} \int_{S_i} \mathcal{U}_{S_i}(x) \cdot G(x) \cdot S_i^{(n)} dx = \sum_i S_i^{(A)} \cdot \mathbb{E}_{x \sim \mathcal{U}_{S_i}} [G(x) \cdot S_i^{(n)}], \end{aligned}$$

where $S_i$ is the i-th boundary simplex, $S_i^{(A)}$ its area, and $S_i^{(n)}$ its outward-facing unit normal.

Alternatively, multiplying and dividing the surface integral $\int_S G \cdot dS$ with the total surface area $(\Sigma_i S_i^{(A)})$:

$$\int_S G \cdot dS = (\Sigma_i S_i^{(A)}) \cdot \mathbb{E}_{x \sim \mathcal{U}_S} [G(x) \cdot n(x)], \tag{13}$$

where n(x) is the outward-facing unit normal at x. Note that $\mathcal{U}_S$ can be decomposed in terms of a categorical distribution $c_i = S_i^{(A)}/\Sigma_j S_j^{(A)}$ over the simplices $S_i$ and the uniform distributions $\mathcal{U}_{S_i}$. More specifically, $\mathcal{U}_S(x) = \Sigma_i c_i \cdot \mathcal{U}_{S_i}(x)$, all but one of the terms are zero for a point x on the surface S—because the simplices are non-overlapping and the point x belongs to exactly one of them.

Adaptive Estimation in Target Space

While the stochastic boundary flux estimator introduced above is unbiased, it does not allow for a strategic placement of evaluation points in an iterative fashion. Eq. (12) can be turned into a sequential process by first approximating $\mathbb{E}_{x \sim \mathcal{U}_{S_i}} [G(x) \cdot S_i^{(n)}]$ with a deterministic estimate and then performing prioritized iterative refinements.

Deterministic Boundary Flux Estimator

Given a set of boundary simplices $\{S_i\}_i$, one can approximate the expected dot-product in Eq. (12) by the average dot-product over the vertices of $S_i$. Formally, this adaptive boundary flux (BF-A) estimator of $P(x \in V)$ is given by $$\int_S G \cdot dS \approx \Sigma_i S_i^{(A)} \cdot \overline{G}(S_i) \cdot S_i^{(n)}, \tag{14}$$

where $\overline{G}(S_i)$ is the average G-field over all vertices of $S_i$.

While Eq. (14) is a biased estimate of the cumulative density $P(x \in V)$, its deterministic nature and inherent structure increase sample efficiency (e.g., prudent placement, reuseable computations) and enable strategic refinements to arbitrary precision.

Figure 5:
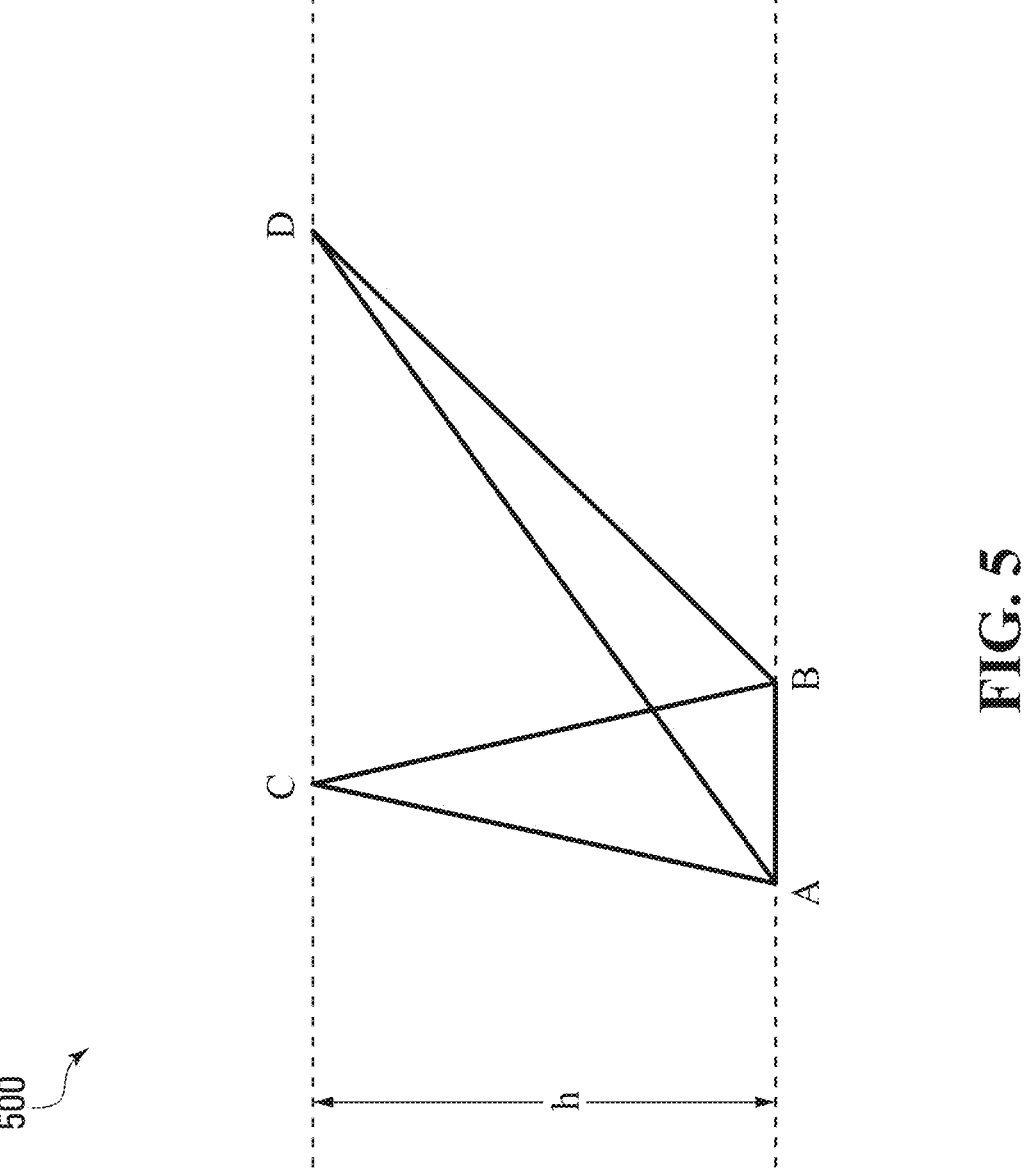
FIG. 5 shows two simplices with identical areas but unequal edge-lengths.

FIG. 5 is a simple illustration 500 showing splitting criterion (total edge length). For two simplices (e.g., triangles ABC and ABD) with equal area, the uncertainty about the dot-product within a simplex grows with a point's distance to its closest vertex, motivating the use of total edge length as a splitting criterion.

Iterative Refinement

The quality of the approximation in Eq. (14) can be controlled via iterative refinement of the initial set of boundary simplices $\{S_i\}_i$. Each refinement step consists of a splitting operation that first introduces one new vertex at the midpoint of a boundary line segment (the (d−1)-simplices $\{S_i\}_i$ forming the boundary S each consists of d choose 2 line segments), and then splits all simplices sharing that edge.

The key component of this splitting process is a priority queue Q managing the next boundary line segment l to split, where l is the longest edge of the simplex with highest priority according to a priority function Pr.

Pr is designed such that it gives high priority to simplices which probably have high error. As a general rule, the larger the simplex the larger the variation in the dot-products, and hence the larger the estimation bias. Although the area $S_i^{(A)}$ of a simplex squarely fits the definition of size, it can be a misleading measure that should not be used in isolation— see FIG. 5 for an illustrated explanation.

Therefore, in some embodiments, the total edge length is also used as a measure of size. While this approach works well in lower dimensions, marked improvements are seen in terms of sample efficiency in higher dimensions after complementing these two criteria with the standard deviation of the dot-products at the vertices. Taken together, the priority of the i-th simplex $S_i$ can be defined as $$Pr(S_i)=S_i^{(A)}\times(\sigma_d(S_i)+\epsilon)\times\Sigma_{e_j\in S_i}\|e_j\|_2^2, \tag{15}$$

where $e_j$ is the j-th edge (1-simplex) constituting the simplex $S_i$, $\sigma_d(S_i)$ is the standard deviation of the dot-products— computed with the unit surface normal—across the simplex $S_i$, and $\epsilon$ is a small number to guard against assigning a zero priority to large simplices whose dot-products at the vertices are all zero.

A priority queue of simplices can be formed with the priority defined as above; at each split, the simplex with highest priority is chosen and split the longest edge at its mid point. Summarily, one split introduces one new point to the simplicial complex, but splits all the neighboring simplices that shared the edge chosen to split. See below for a summary of this process in pseudo code.

In order to improve the CDF estimate, one would have to split the boundary simplices so that the biased estimate of the expected dot-product approximates the correct value. In order to allow for the most flexible splitting of simplices, splitting the line-segments forming the simplex is implemented. Note that splitting one line-segment of the simplex also splits the neighboring simplices that share the same edge.

The first step in splitting simplices is to identify simplices which probably have the biggest error. As a general rule, the larger the simplex, the larger the variation in estimating the dot-products and hence the larger the estimation bias. Although the area of the simplex $S_i^{(A)}$ squarely fits the definition of size, it can be a misleading measure —see FIG. 5 for an illustrated explanation 500, which shows the uncertainty about the dot-product within a simplex 500 grows with a point's distance to its closest vertex, motivating the use of total edge length as a splitting criterion.

Best Case Scenarios

The integral of G over a simplex $S_i$ can be computed exactly if the flow transformation g is: (a) linear over the simplex $S_i$; or (b) $G \cdot S_i^{(n)}$ is constant for all $x \in S_i$. The latter is equivalent to F·dA being constant, such as for hyperspheres. In both cases, $\overline{G}(S_i)=\mathbb{E}_{x\sim u_{S_i}}[G(x)]$. In practice, it is rarely possible to realize these best cases, however, if the dot-product is locally-linear over the simplex, a biased estimate is a good approximation to the exact integral. For example, observe that the field lines of G vary across the boundary $\partial V$ in FIG. 1. The true value of $\mathbb{E}_{x\sim u_{S_i}}[G(x)]$ thus differs from its approximation $\overline{G}(S_i)$—a gap to minimize with the adaptive splitting protocol described above.

Runtime Complexity and Implementation Considerations

For a given simplicial polytope, the algorithm first computes the surface normals for each of the boundary simplices, which requires computing d determinants of (d−1)×(d−1) matrices for each boundary simplex. The total complexity of this initialization step is thus $o(kd^4)$, where k is the number of boundary simplices. Note that the surface normals do not need to be recomputed after splitting edges. Furthermore, if regions are defined as a set of half-spaces (i.e., linear inequalities), the surface normals are immediately available and do not require the quartic initialization step. Following this initialization, the manipulation of the priority queue with every split is logarithmic in the number of boundary simplices.

When computing G, one has to first flow the input to the uniform distribution and then compute the Jacobian-vector product of the backward-pass; in order to avoid computing the Jacobian-vector product, one can first compute the vector-Jacobian product $S_i^{(n)T}J^{-1}$ of the backward-pass followed by a dot-product with |J|F to obtain $S_i^{(n)T}|J|J^{-1}F$. This avoids an extra backward-pass in PyTorch, which does not support forward-mode auto-differentiation of Jacobian-vector-products. In fact, the derivative of $S_i^{(n)T}|J|J^{-1}F$ with respect to $S_i^{(n)T}$ yields exactly G.

Computing Surface Normals

In applying the divergence theorem, one would need to compute the surface normal vector. In some embodiments, surface normals can be computed to the (d−1)-dimensional simplices constituting the boundary: for example, one would need to compute the surface normal to line-segments in 2D, triangles in 3D, tetrahedrons in 4D and so on.

By definition of (d−1)-dimensional simplices, they lie in a plane defined by (d−1) linearly independent vectors; since normals to (d−1)-dimensional simplices lying in $\mathbb{R}^d$ are being computed, the vectors spanning the plane containing the simplex and the normal vector to this plane form a full basis of $\mathbb{R}^d$. In general, one could imagine solving a system of simultaneous equations in order to determine a vector normal to a given set of vectors.

In this specific case, in order to compute a normal vector to (d−1) linearly independent vectors, one can just define the normal vector to a simplex z defined by the vertex set $\{z_i\}_i$ in terms of the determinant:

$$v = \left\|\begin{bmatrix} e \\ z_2 - z_1 \\ z_3 - z_1 \\ \vdots \\ z_d - z_1 \end{bmatrix}\right\| \tag{16}$$

where, e is the orthonormal unit basis in $\mathbb{R}^d$. Since the determinant of a matrix containing two identical rows evaluates to 0, one can easily confirm that the dot product $\forall i \in [2, d]$, $v\cdot(z_i-z_1)=0$. Also note that at a high level, this construction resembles the vector cross-product operation. In fact, similar to vector cross products, the vector norm of the v is equal to the volume of the parallelotope spanned by the set of (d−1) linearly independent vectors $\{z_i-z_1\}_i$. Therefore, in order to derive the surface normal vector whose magnitude is equal to the volume of the simplex z, one would need to divide v with (d−1)!:

$$z^{(n)} = \frac{1}{(d-1)!}\left\|\begin{bmatrix} e \\ z_2 - z_1 \\ z_3 - z_1 \\ \vdots \\ z_d - z_1 \end{bmatrix}\right\| \tag{17}$$

Accordingly, for some vector w, the dot-product $w \cdot z^{(n)}$ can be written as:

$$w \cdot z^{(n)} = \frac{1}{(d-1)!} \left\| \begin{bmatrix} w \\ z_2 - z_1 \\ z_3 - z_1 \\ \vdots \\ z_d - z_1 \end{bmatrix} \right\| \tag{18}$$

FIG. 6 is an example flow chart 600 for estimating a CDF of a region of interest, as carried out by a system 100 including a CDF Estimator 115, in accordance with some embodiments.

In some embodiments, during training of the neural network in the CDF Estimator 115, the system 100 may receive, as training input, historical data representative of past target events and wherein the boundary of the volume V of the target space is defined based in part on the historical data.

In some embodiments, during training of the neural network, the system 100 may use a model fitting process to generate a Probability Distribution Function (PDF) based on the historical data.

In some embodiments, during the training of the neural network, one or more weights of the neural network are iteratively updated to improve the estimation of the CDF by selecting points on the boundary of the volume V.

Once the CDF Estimator 115 is properly trained for a specific use case or practical application, the trained neural network is stored on a memory device on system 100.

At operation 605, the processor of system 100 may receive input data representing a volume V of a target space indicating a future target event. The future target event may be, for example, a peak event.

In some embodiments, the input data may further include historical data representative of past peak events, and the boundary of the volume V of the target space is computed based in part on the historical data. For example, the processor may be configured to use a model fitting process to generate a Probability Distribution Function (PDF) based on the historical data.

At operation 610, the processor may compute, using the trained neural network, an estimation of a first flux through a boundary of the volume V.

For example, the first flux may be a flux through the transformed boundary $g(\partial V)$ of V in base space.

At operation 620, the processor may compute, using the trained neural network, an estimation of a second flux through a boundary of a volume W of a base space based on the estimation of the first flux through the boundary of the volume V.

For example, the second flux may be the surface integral of a given vector field and a measure of how much of the vector field passes through a closed surface—through the untransformed boundary $\partial V$ of V to enable direct integration in target space.

At operation 630, the processor may generate, using the trained neural network, an estimation of a CDF for the volume V based on the second flux through the boundary of the volume W.

For example, referring again to FIG. 4A, considering the cumulative density P induced by a normalizing flow f over a complex region V corresponds to integrating over the boundary $\partial W = g(\partial V)$ in a uniform base space 420 with respect to a vector field F with constant divergence 1, which can be expressed as an integration over the boundary $\partial V$ in the target space 400 with respect to an equivalent vector field G.

In some embodiments, the CDF for the volume V is based on a flux through the transformed boundary of the volume V in the base space.

For example, the second flux may be computed based on the flux through the transformed boundary of the volume V in the base space.

In some embodiments, the estimation the CDF for the volume V is based on a flux through the untransformed boundary of the volume V in the target space.

For example, the first flux may be computed based on the flux through the untransformed boundary of the volume V in the target space.

For example:

$$P(x \in V) = \int_V p_X(x)dx,$$

where $P(x \in V)$ is a cumulative density over the volume V, and x represents a random variable with the complex target distribution $p_X(x)$.

In some embodiments $$p_X(x) = p_Y(y) \; abs\left( \left| \frac{dg}{dx} \right| \right),$$

wherein: $|\cdot|$ is a determinant, $abs(\cdot)$ denotes absolute value, g is inverse of f, $$\frac{dg}{dx}$$

is (d×d)—Jacobian J of g, x represents the random variable with the complex target distribution $p_X(x)$ using a bijective mapping $f: \; > \mathbb{R}^d \to \mathbb{R}^d$, y is a random variable with a base distribution $p_Y(y)$.

In some embodiments, $p_Y(y)$ comprises a Gaussian distribution.

In some embodiments, $p_Y(y)$ comprises a uniform distribution.

At operation 640, the processor may compute a probability for the future target event based on the estimated CDF for the volume V.

At operation 650, the processor may generate a control command based on the probability for the future target event. For example, if the peak event is a low airflow or low oxygen event in a building, a control signal may be generated to evacuate the building.

For another example, if the peak event is a low blood sugar event for a monitored patient, a control signal may be generated to alert the patient to take his or her medication or food, while generating a message to a family member, or a doctor.

Experiments

In this section, example embodiments of one or more CDF estimators (e.g., adaptive boundary flux (BF-A) estimator) is evaluated against traditional sampling-based estimators such as the Monte-Carlo (MC) and Importance Sampling (IS) Estimators. As the accuracies of the CDF estimates of the baseline estimators are mainly a function of sample size [Cunningham et~al. (2013) Cunningham, Hennig, and Lacoste-Julien], all estimators are compared based on sample budgets.

For the purpose of evaluation, normalizing flows are trained on d-dimensional ($d \in \{2,3,4,5\}$) data derived from 4 tabular datasets open sourced as part of the UCI Machine Learning Repository [Dua Graff (2017)] and preprocessed as in [Papamakarios et~al. (2017)]: Power, Gas, Hepmass, and Miniboone.

Normalizing flows are constructed from the following three architecture families: Glow [Kingma Dhariwal (2018)], Masked Autoregressive Flow (MAF) [Papamakarios et~al. (2017)], and FFJORD [Grathwohl et~al. (2019)]. For every pair (dataset, d), 2 random d-dimensional slices of the dataset are obtained for training the normalizing flows.

Additionally, how the capacities of these models affect the performance are also considered: for the two discrete flows (Glow and MAF), the number of hidden dimensions in the coupling networks and the number of flow transforms stacked together are varied; for FFJORD, the number of hidden dimensions in each layer of the MLP parameterizing the ODE is varied. For constructing discrete flows, 3, 5 or 7 flow layers are chosen to construct coupling layers with 16, 32 or 64 hidden units.

While one Glow layer corresponds to a sequence of (ActNorm)-(Glow Coupling)-(Invertible 1×1) transformations, one MAF layer corresponds to a sequence of (ActNorm)-(MAF Coupling) transformations. For continuous flows, the neural ODE with 2 hidden layers are parameterized, each consisting of 16, 32 or 64 hidden units. In summary, a total of 168 flow models are obtained for every $d \in \{2,3,4,5\}$: 9 each from the 2 discrete flow families and 3 from the continuous flow, trained on 2 slices derived from each of the 4 datasets.

Generating Simplicial Polytopes

An important component in ensuring a fair and unbiased evaluation of the estimators is in uniformly sampling simplicial polytopes V in target space such that they are not biased towards any specific regions or cumulative densities.

In order to actually sample a simplicial polytope, a convex hull is constructed around a fixed number of points in target space. To ensure that convex hulls of varying sizes are equally explored, these points are sampled from the boundary of a sphere centered at a flow sample and control the size of the convex hull by controlling the radius of the sphere. It can be observed that the inclusion of very small convex hulls can lead to inconsistent results across runs due to large relative errors of the sampling-based estimators (MC, IS). Thus only convex hulls with CDFs larger than 0.01 are accepted for fairness and to improve stability and reproducibility between runs.

In the evaluation 20 points are used to construct the hull, trading off lower cumulative densities against linear approximation of the spherical boundary. Note that all 20 points lie on the boundary of the hull and count against the sample budget of the BF-A algorithm. Furthermore, spheres with radius 0.5, 0.75, and 1.0 are considered, amounting to a coverage radius of up to 1 standard deviation for normalized data. Finally, in order to evaluate a normalizing flow model, 5 convex hulls are constructed for each choice of the radius. Overall, each CDF estimator is evaluated over a total of 10,080 hulls $$\left(10{,}080 \text{ hulls} = 168\frac{\text{models}}{\text{dim}} \cdot 4 \text{ dim} \cdot 5\frac{\text{hulls}}{\text{models} \cdot \text{radii}} \cdot 3 \text{ radii}\right).$$

Evaluation

For each convex hull, a reference cumulative density is computed using 2M importance samples and evaluate all estimators against this gold standard based on their predicted cumulative density using a fixed sample budget K. Unlike the proposed adaptive boundary flux (BF-A) estimator, which is deterministic, the Monte-Carlo (MC) and Importance Sampling (IS) estimators are stochastic. Thus, in order to accurately capture the variance of these estimators, results across 5 runs are collected for each hull. The estimators are then evaluated in terms of both relative and absolute errors.

Table 1 shows the aggregate results across all 10,080 configurations with a sample budget of 4,000 points. The absolute and relative errors of each estimator for a sample budget of 4,000 points, averaged across all evaluation axes. The proposed BF-A algorithm outperforms the IS and MC estimators in terms of both absolute and relative errors ($p<0.001$ in a one-sided U-Test).

TABLE 1

| Quantitative Evaluation (Aggregate). | | |
| --- | --- | --- |
| Estimator | Absolute Error | Relative Error |
| IS | $0.00572 \pm 0.01585$ | $0.03000 \pm 0.04632$ |
| MC | $0.00381 \pm 0.00381$ | $0.04864 \pm 0.05178$ |
| BF-S | $0.01705 \pm 0.04175$ | $0.19032 \pm 0.53439$ |
| BF-A (ours) | $0.00152 \pm 0.00554$ | $0.01822 \pm 0.06626$ |

On average, the BF-A estimator in disclosed embodiment(s) obtains approximately 3.8× and 2.5× lower absolute errors than IS and MC, respectively, for a sample budget of 4,000 points (Table 1 above); likewise, the BF-A estimator obtains 1.7× and 2.7× lower relative errors than IS and MC, respectively.

For the specific case of 2D flows, the BF-A estimator reports relative errors that are better than IS by 11.1× and MC by 21.2× (Table 2(a) below); also see FIGS. 7A, 7B and 7C for a qualitative comparison of the estimators in 2D in terms of the absolute deviation from the true cumulative density.

In all 3 cases the proposed algorithm converges to the true estimate well within 500 samples, while the stochastic estimates of the MC and IS estimators exhibit high variance. This pattern is consistent across experiments with 2D flows and the BF-A estimator in disclosed embodiment(s) outperforms IS and MC by 30× and 55×, respectively, for a sample budget of just 500 points.

Conversely, the MC and IS algorithms would require ~50 k samples on average to match the relative errors of the BF-A estimator with just 4,000 samples in 2D. Averaged across all flows and dimensions (2D-5D), the baseline estimators would require 9.6× as many samples to match the relative error rates of the BF-A estimator. If accounting for per-sample running time, the baseline estimators can process slightly more samples in the same time that would be needed by BF-A to form an estimate with 4,000 samples. However, they would still require 6.4×more time on average to match the relative error rates of BF-A. Nevertheless, absolute runtime depends on a number of confounding factors—such as programming language, dedicated data structures, compute device, and low-level optimizations—making a fair comparison difficult. Runtime optimization is viewed as an orthogonal research direction that can further capitalize on faster convergence rates and better sample efficiencies of CDF estimators.

TABLE 2 a

| | | (a) Dimension-wise | |
|---|---|---|---|
| Dim | Estimator | Absolute Error | Relative Error |
| 2 | IS | 0.00737 ± 0.01981 | 0.01620 ± 0.02459 |
| | MC | 0.00482 ± 0.00434 | 0.03101 ± 0.03366 |
| | BF-A (ours) | 0.00071 ± 0.00281 | 0.00146 ± 0.00308 |
| 3 | IS | 0.00528 ± 0.01564 | 0.02543 ± 0.03618 |
| | MC | 0.00363 ± 0.00381 | 0.05247 ± 0.05202 |
| | BF-A (ours) | 0.00134 ± 0.00584 | 0.00710 ± 0.03254 |
| 4 | IS | 0.00405 ± 0.00818 | 0.04495 ± 0.05404 |
| | MC | 0.00274 ± 0.00251 | 0.06576 ± 0.06162 |
| | BF-A (ours) | 0.00237 ± 0.00780 | 0.03209 ± 0.08405 |
| 5 | IS | 0.00376 ± 0.00640 | 0.07233 ± 0.08153 |
| | MC | 0.00244 ± 0.00218 | 0.07340 ± 0.06483 |
| | BF-A (ours) | 0.00380 ± 0.00658 | 0.07796 ± 0.14184 |

TABLE 2 b

| | | (b) Size-wise | |
|---|---|---|---|
| Radius | Estimator | Absolute Error | Relative Error |
| 0.5 | IS | 0.00338 ± 0.01066 | 0.01895 ± 0.02430 |
| | MC | 0.00336 ± 0.00336 | 0.05670 ± 0.05612 |
| | BF-A (ours) | 0.00073 ± 0.00287 | 0.01016 ± 0.04500 |
| 0.75 | IS | 0.00480 ± 0.01327 | 0.02771 ± 0.04061 |
| | MC | 0.00365 ± 0.00350 | 0.04896 ± 0.05205 |
| | BF-A (ours) | 0.00126 ± 0.00460 | 0.01666 ± 0.05429 |
| 1.0 | IS | 0.00808 ± 0.01998 | 0.03941 ± 0.05871 |
| | MC | 0.00425 ± 0.00428 | 0.04292 ± 0.04761 |
| | BF-A (ours) | 0.00229 ± 0.00728 | 0.02500 ± 0.08450 |

A comparison across different hull radii is shown in Table 2(b) above. While the absolute errors of all estimators increase with increasing hull-sizes, the relative errors of MC decrease with increasing hull sizes, while those of IS and the BF-A estimator increase with increasing hull sizes; nonetheless, the BF-A estimator outperforms IS and MC in terms of both absolute and relative errors for the explored hull sizes. The observed trends are in line with the analysis above, both for discrete and continuous flows. Varying the width of the coupling transform (in discrete flows) does not affect the observed trends as much as the depth of the flow transform. Finally, similar trends across varying flow architectures as well.

The qualitative and quantitative evaluations show a marked improvement of the proposed method over traditional sampling-based estimators. BF-A benefits from novel formulation of cumulative densities as boundary fluxes as well as from the sample efficiency enabled by the priority function Pr. BF-S, the stochastic realization of the boundary flux estimator (Eq. (13)) uses random samples on the boundary to form a Monte-Carlo estimate of the CDF and accrues a higher relative error of 0.19 on average compared to the other Monte-Carlo estimators (Table 1); nonetheless, its formulation readily extends itself to an adaptive refinement in (d−1)—dimensional space, which is used in developing the BF-A estimator.

Although the BF-S estimator cannot be directly applied to obtain sample-efficient and accurate CDF estimates, it could form the basis of stochastic-adaptive estimators in the future. Intuitively, the estimation error of the BF-A estimator can be traced back to how much the dot-product $G \cdot n$ can change for small changes in the input x; in fact, the motivation behind evaluating the estimators as a function of growing dimensions, growing hull-sizes, and growing model capacities is targeted towards testing how well the disclosed estimator can adapt to increasing complexity.

While the disclosed estimator continues to outperform the sampling-based estimators with growing hull sizes (Table 2(b)), model capacities, varying flow architectures, and data dimensions up to and including 4D, BF-A only performs comparably to the sampling-based estimators for a sample budget of 4,000 points with 5D flows (Table 2(a)).

Tables 2(a) and 2(b) show quantitative evaluation. It can be seen that the absolute and relative errors of each of the methods for a sample budget of 4,000 points, averaged across all configurations separately for (a) each dimensionality and (b) each radius of the hull. BF-A outperforms both IS and MC on average for flows<5D and the explored hull sizes (p<0.001 in a one-sided U-Test for each evaluation block).

In some embodiments, the proposed estimator may include using higher-order information of the model, such as curvature, in defining the priority function in order to improve the scaling of the method; this may also enable the definition of a more natural stopping criterion than sample budget. In some embodiments, the adaptive estimator may be to split a batch of edges together as opposed to splitting a single edge at a time. Additionally, it remains to be explored how different choices of field F could be used in minimizing the estimation error for a given simplicial polytope. Some embodiments may be implemented to explore regularization methods that encourage smoother transformations between the target and base spaces.

Figure 7A:
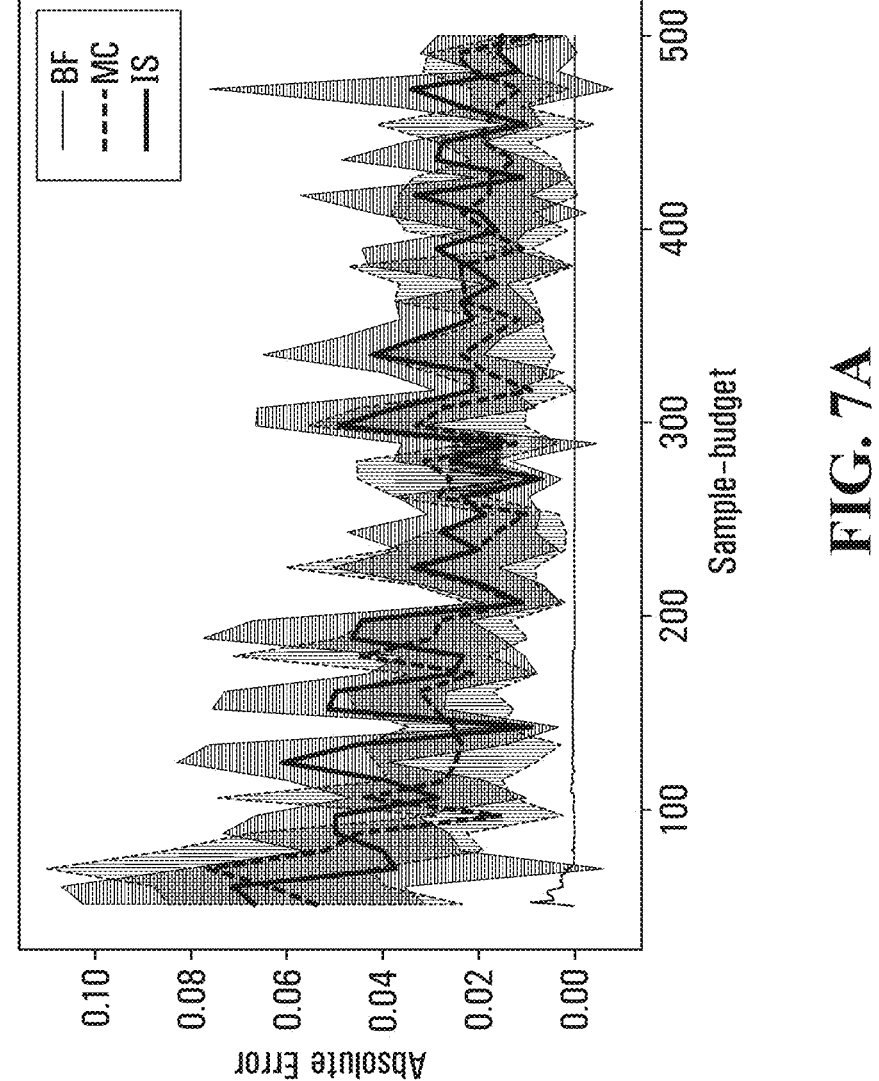
FIGS. 7A, 7B and 7C show a sample efficiency of an example CDF Estimator, a Deterministic Boundary (DB)
Figure 7B:
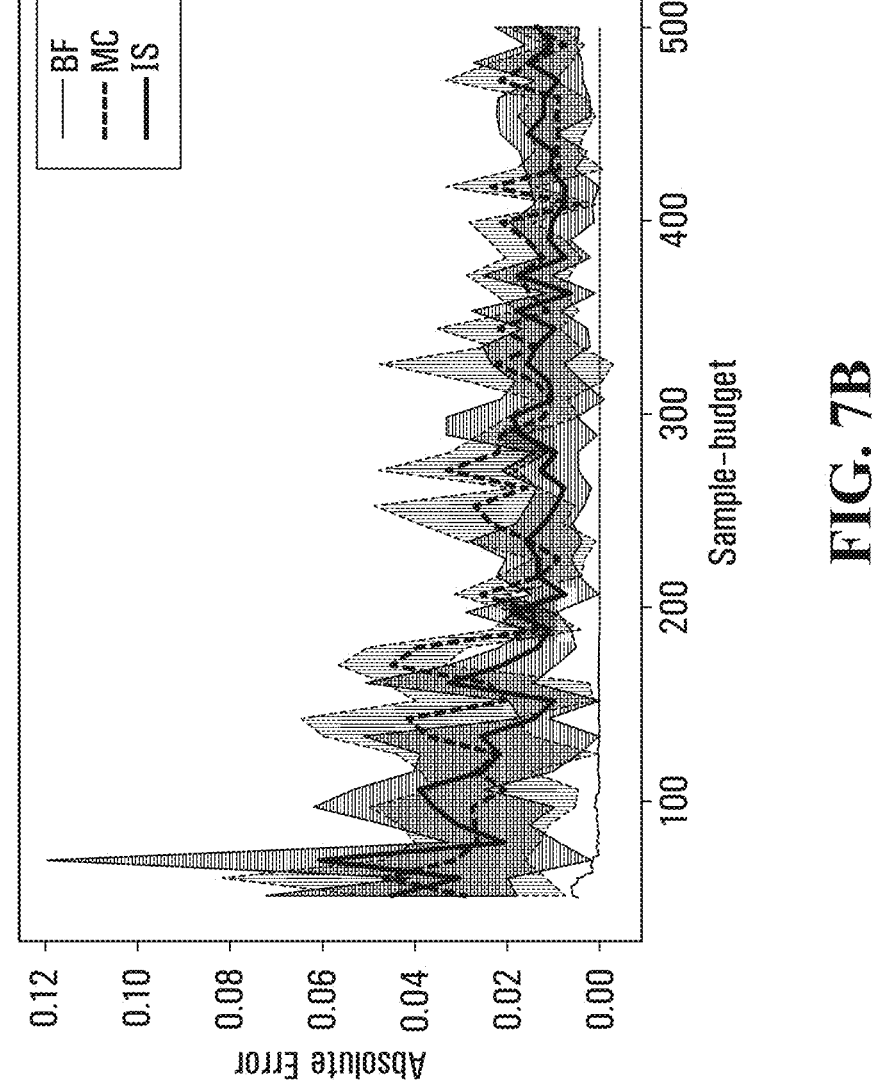
Figure 7C:
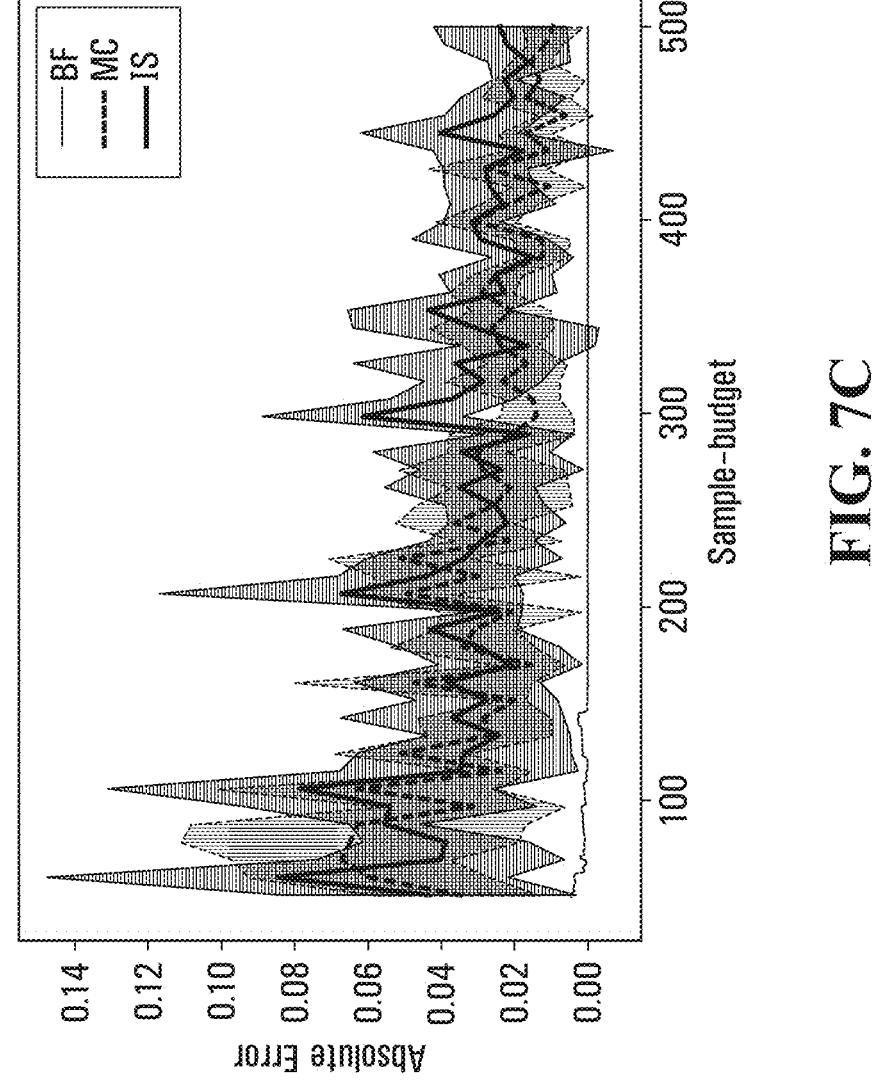

FIGS. 7A, 7B and 7C show the highlight the sample efficiency of the proposed adaptive boundary flux (BF-A) estimator as compared to Monte-Carlo (MC) and Importance Sampling (IS) estimators. Absolute estimation errors for 3 flow architectures are shown: two discrete normalizing flows (Glow and MAF)—composed of 7 flow-layers with 64 hidden units in their coupling nets—and one continuous normalizing flow (FFJORD)—parameterized by a 2-layer MLP with 64 hidden units in each layer. All models were trained on a 2D slice of the Power dataset, with volumes V given by convex hulls constructed from points sampled on the surface of spheres with radius 1.0, centered at points sampled from the flow.

FIGS. 7A, 7B and 7C show a qualitative comparison of estimators for 2D flows in terms of the absolute deviation from the true CDF estimate as obtained over a random hull: in all 3 cases, the example CDF Estimator converges to the true estimate with 500 points while the estimates of the sampling algorithms exhibit high variance. In fact, across experiments with 2D flows, the example CDF Estimator is better than IS and MC by 54× and 96×respectively for a sample budget of just 500 points.

Extended Results

Below are results that evaluate the disclosed estimators as a function of flow-architectures and their capacities, and plots to visually summarize the quantitative results.

Varying width of the coupling transform does not affect the observed trends as much as the depth of the flow-transform; nonetheless, the observed trends are more or less conformant with the average trends as noted above.

TABLE 3

| | Estimator | Absolute Error | Relative Error |
|---|---|---|---|
| Depth | | | |
| 3 | IS | 0.00449 ± 0.01048 | 0.02683 ± 0.04063 |
| | MC | 0.00359 ± 0.00334 | 0.04844 ± 0.05345 |
| | BF-A (ours) | 0.00115 ± 0.00479 | 0.01719 ± 0.07362 |

TABLE 3-continued

| | Estimator | Absolute Error | Relative Error |
|---|---|---|---|
| 5 | IS | 0.00562 ± 0.01381 | 0.03167 ± 0.04787 |
| | MC | 0.00372 ± 0.00336 | 0.04833 ± 0.05216 |
| | BF-A (ours) | 0.00142 ± 0.00536 | 0.02221 ± 0.07773 |
| 7 | IS | 0.00585 ± 0.01499 | 0.03113 ± 0.04583 |
| | MC | 0.00375 ± 0.00342 | 0.04776 ± 0.05186 |
| | BF-A (ours) | 0.00192 ± 0.00775 | 0.02470 ± 0.08521 |
| Width | | | |
| 16 | IS | 0.00552 ± 0.01409 | 0.03095 ± 0.04505 |
| | MC | 0.00368 ± 0.00335 | 0.04851 ± 0.05277 |
| | BF-A (ours) | 0.00195 ± 0.00767 | 0.02290 ± 0.07088 |
| 32 | IS | 0.00544 ± 0.01357 | 0.02940 ± 0.04310 |
| | MC | 0.00365 ± 0.00334 | 0.04782 ± 0.05253 |
| | BF-A (ours) | 0.00130 ± 0.00609 | 0.01944 ± 0.07800 |
| 64 | IS | 0.00501 ± 0.01200 | 0.02932 ± 0.04666 |
| | MC | 0.00374 ± 0.00342 | 0.04820 ± 0.05217 |
| | BF-A (ours) | 0.00125 ± 0.00396 | 0.02184 ± 0.08754 |

Table 3 shows quantitative evaluation (capacity—Glow and MAF): the absolute and relative errors of each of the methods with a sample budget of 4000 points as a function of the depth and width of discrete flows as explained, the example CDF Estimator outperforms both IS and MC.

From Table 4 below, while the absolute errors of all estimators increase with increasing hull-sizes, the relative errors of MC decrease with increasing hull-sizes while that of IS and the example CDF Estimator increase with increasing hull-sizes, nonetheless, the example CDF Estimator outperforms IS and MC in terms of both absolute and relative errors for explored hull-sizes.

TABLE 4

| Radius | Estimator | Absolute Error | Relative Error |
|---|---|---|---|
| 0.5 | IS | 0.00292 ± 0.00806 | 0.01917 ± 0.02453 |
| | MC | 0.00326 ± 0.00301 | 0.05590 ± 0.05752 |
| | BF-A (ours) | 0.00056 ± 0.00247 | 0.01207 ± 0.05462 |
| 0.75 | IS | 0.00474 ± 0.01184 | 0.02862 ± 0.04172 |
| | MC | 0.00362 ± 0.00330 | 0.04883 ± 0.05303 |
| | BF-A (ours) | 0.00127 ± 0.00513 | 0.01953 ± 0.06465 |
| 1.0 | IS | 0.00745 ± 0.01650 | 0.03820 ± 0.05540 |
| | MC | 0.00402 ± 0.00362 | 0.04242 ± 0.04755 |
| | BF-A (ours) | 0.00233 ± 0.00816 | 0.02926 ± 0.10062 |

Table 4 shows quantitative evaluation (size-wise): the absolute and relative errors of each of the methods with a sample budget of 4000 points averaged across all the configurations separately for each radius of the hull. On average, the example CDF Estimator (e.g., BF-A) performs better than IS and MC in terms of both absolute and relative error.

Table 5 (a) below shows the absolute and relative errors of each of the methods for a sample budget of 4,000 points as a function of the flow-architecture; the BF-A Estimator, which is an example of CDF Estimator, outperforms both IS and MC.

In addition, the BF-A Estimator, which is an example of CDF Estimator, is more efficient with Neural ODEs than with Glow or MAF—this can be attributed to the fact that Neural ODEs have much smoother diffeomorphic transformations than Glow and MAF. Perhaps more importantly, the Neural ODEs also obtain similar or better training log-likelihoods than Glow and MAF.

TABLE 5 a

| (a) Flow-Architecture | | | |
|---|---|---|---|
| Flow | Method | Absolute Error | Relative Error |
| Glow | IS | 0.00395 ± 0.01131 | 0.02524 ± 0.03818 |
| | MC | 0.00357 ± 0.00328 | 0.05072 ± 0.05421 |
| | BF-A (ours) | 0.00155 ± 0.00726 | 0.01963 ± 0.07250 |
| MAF | IS | 0.00667 ± 0.01480 | 0.03445 ± 0.05032 |
| | MC | 0.00379 ± 0.00346 | 0.04568 ± 0.05062 |
| | BF-A (ours) | 0.00145 ± 0.00473 | 0.02311 ± 0.08501 |
| FFJORD | IS | 0.00649 ± 0.02000 | 0.03021 ± 0.04890 |
| | MC | 0.00405 ± 0.00455 | 0.04955 ± 0.05034 |
| | BF-A (ours) | 0.00157 ± 0.00417 | 0.01196 ± 0.02529 |

TABLE 5 b

| (b) Capacity - FFJORD | | | |
|---|---|---|---|
| Width | Estimator | Absolute Error | Relative Error |
| 16 | IS | 0.00631 ± 0.02026 | 0.02975 ± 0.04846 |
| | MC | 0.00383 ± 0.00472 | 0.04961 ± 0.04996 |
| | BF-A (ours) | 0.00171 ± 0.00504 | 0.01430 ± 0.03244 |
| 32 | IS | 0.00614 ± 0.01808 | 0.03005 ± 0.04966 |
| | MC | 0.00400 ± 0.00420 | 0.04991 ± 0.05094 |
| | BF-A (ours) | 0.00131 ± 0.00343 | 0.01034 ± 0.02098 |
| 64 | IS | 0.00701 ± 0.02152 | 0.03080 ± 0.04856 |
| | MC | 0.00432 ± 0.00470 | 0.04914 ± 0.05012 |
| | BF-A (ours) | 0.00170 ± 0.00391 | 0.01132 ± 0.02083 |

Table 5 (b) above contains the absolute and relative errors of each of the methods with a sample budget of 4,000 points as a function of the number of hidden units of two-layer MLPs parameterizing FFJORD; the BF-A Estimator, which is an example of CDF Estimator, outperforms both IS and MC.

Runtime Evaluation. Table 6 below shows The per-sample running times of all the estimators, averaged across all configurations, separately for each dimensionality. In order to obtain a fair evaluation, all of the timing experiments are run in a single non-preemptible job having access to 8 CPUs, 64 GB RAM and one Tesla T4 GPU (16 GB).

TABLE 6

| Dim | Method | Time (sec) |
|---|---|---|
| 2 | IS | 0.00616 ± 0.01209 |
| | MC | 0.00614 ± 0.01178 |
| | BF-A (ours) | 0.00896 ± 0.01375 |
| 3 | IS | 0.00931 ± 0.01858 |
| | MC | 0.00938 ± 0.01773 |
| | BF-A (ours) | 0.01380 ± 0.02357 |
| 4 | IS | 0.01206 ± 0.02466 |
| | MC | 0.01193 ± 0.02288 |
| | BF-A (ours) | 0.01784 ± 0.03092 |
| 5 | IS | 0.01708 ± 0.03419 |
| | MC | 0.01730 ± 0.02887 |
| | BF-A (ours) | 0.02593 ± 0.04062 |

The above qualitative and quantitative evaluations show a marked improvement of the example CDF Estimator (e.g., BF-A) over traditional monte-carlo sampling estimators. The success of the example CDF Estimator (e.g., BF-A) depends on the how new points are obtained. For example, the stochastic realization of the Boundary Flux estimator—as defined in Eq. 13—which uses samples on the boundary to form a monte-carlo estimate of the CDF accrues 10× more relative error on average as compared to the adaptive deterministic realization as defined in Eq. 14.

Intuitively, the estimation error of the BF-A estimator can be traced back to how much the dot-product $G \cdot n$ can change for small changes in the input x; in fact, a motivation behind evaluating estimators as a function of growing dimensions, growing hull-sizes, and growing model capacities is targeted towards testing how well the estimator can adapt with increasing complexity.

In contrast to the stochastic boundary flux estimator, the adaptive extension of the stochastic estimator obtains markedly lower error rates as compared to MC and IS even with the use of a simple and straightforward priority function: while the example CDF Estimator (e.g., BF-A) continues to outperform the sampling-based estimators with growing hull-sizes (Table 4), model-capacities (Table 3) and data-dimensions up to and including 4D, the example CDF Estimator (e.g., BF-A) only performs comparably to the sampling estimators for a sample budget of 4 k points with 5d flows (Table 2).

Cumulative density functions are as fundamentally important as probability density functions, but cannot always be estimated efficiently and exactly. In this disclosure, the example CDF Estimator is derived as an adaptation of the divergence theorem by exploiting the diffeomorphic properties of flow for estimating CDF as the volume of the boundary. Furthermore, this stochastic CDF estimator can be made more sample-efficient by reusing computations and strategically acquiring new points such that the estimate obtains a good CDF estimate with as few points as possible.

In evaluation of the example CDF Estimator (e.g., BF-A), it outperforms traditional sampling-based estimators in terms of sample-efficiencies.

Training Details and Log-likelihoods

For all normalizing flows, example embodiments of the CDF Estimators are trained with a batch size of 10 k and stop when the log-likelihoods do not improve over 5 epochs. For the continuous flows, the exact divergence are used for computing the log-determinant. Exp-scaling in the affine coupling layer of both MAF and Glow models are performed. In order to prevent numerical overflows, a tanh nonlinearity is applied before the exp-scaling. Finally, softplus are used as an activation function for both the Neural ODE and coupling networks.

Figure 8A:
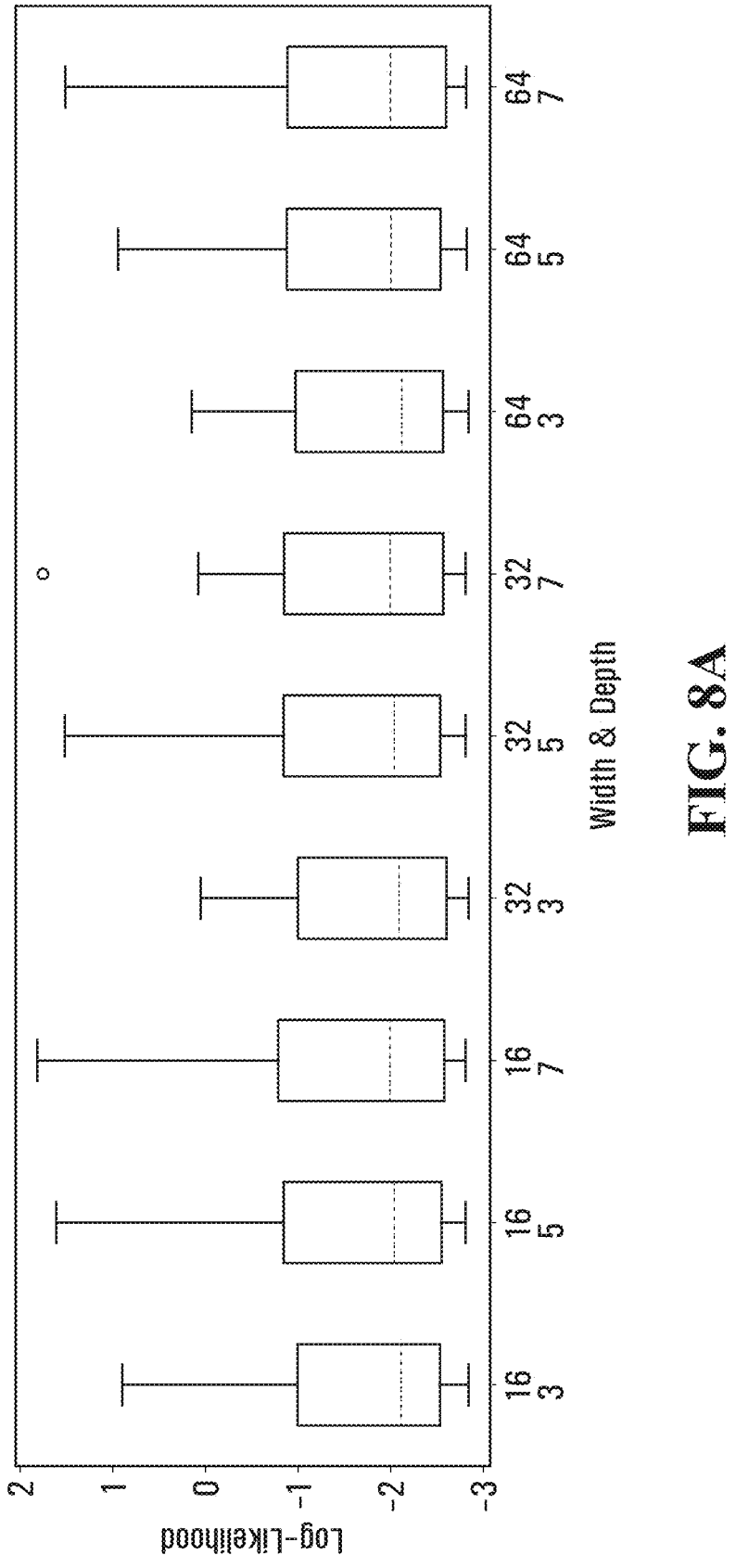
Figure 8B:
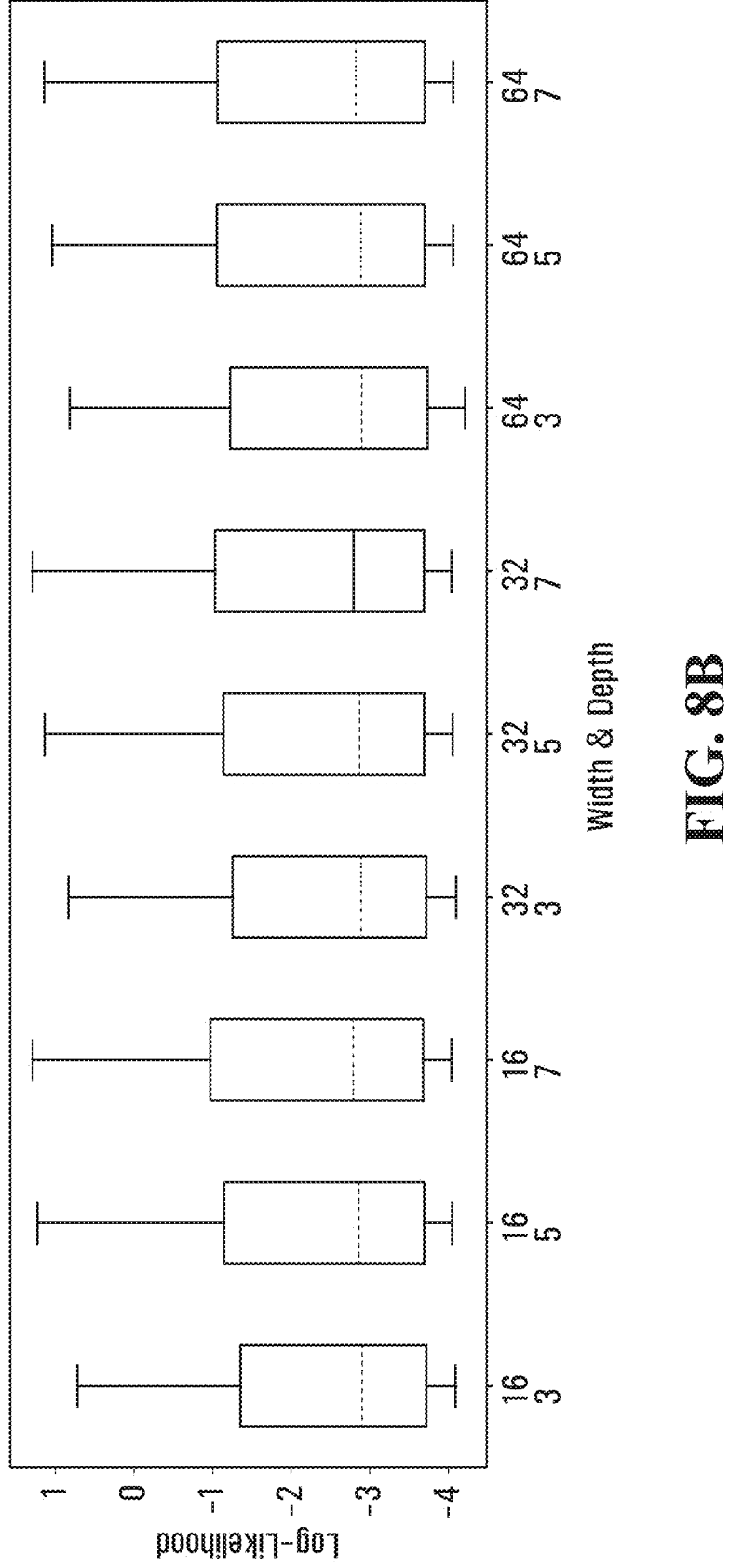
Figure 8C:
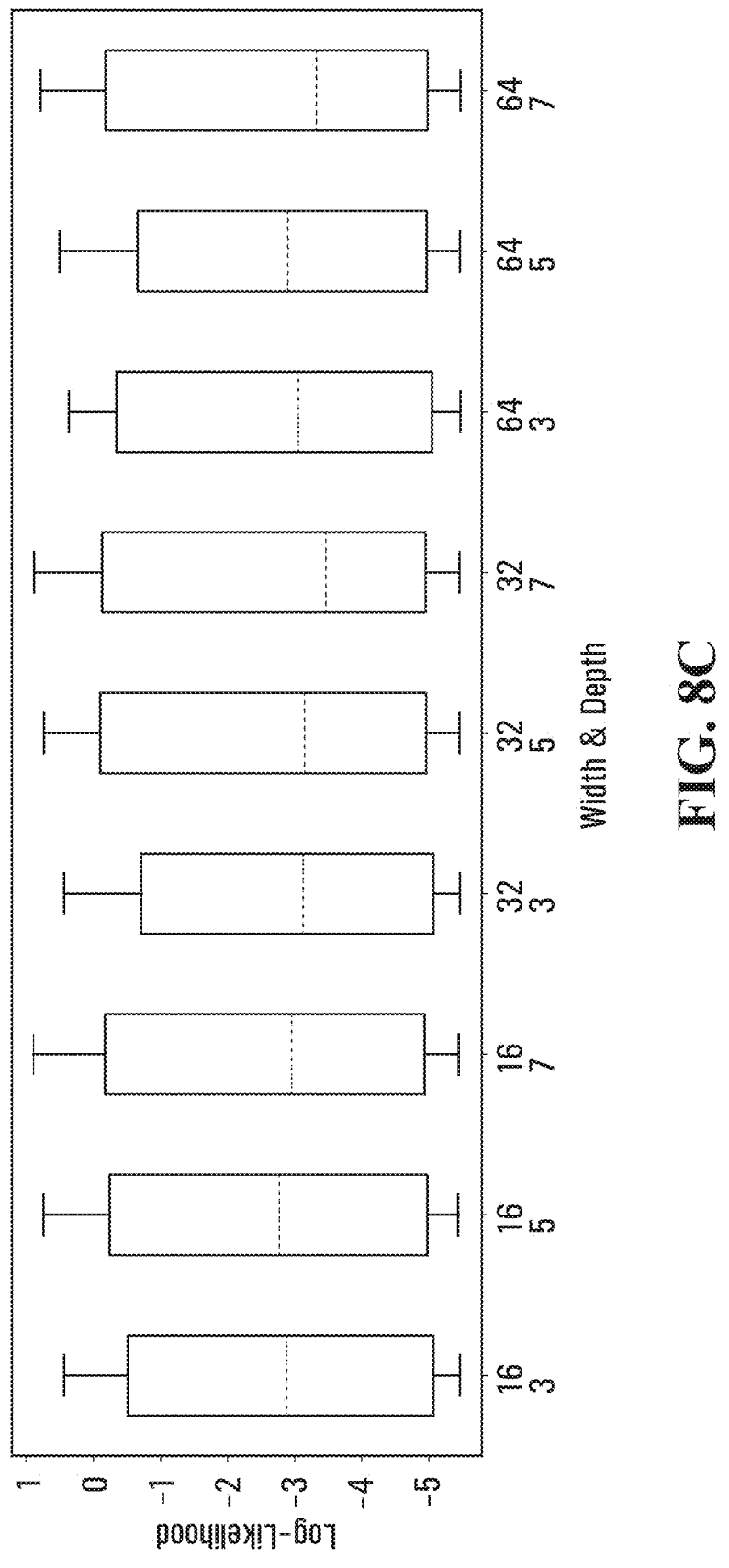
Figure 8D:
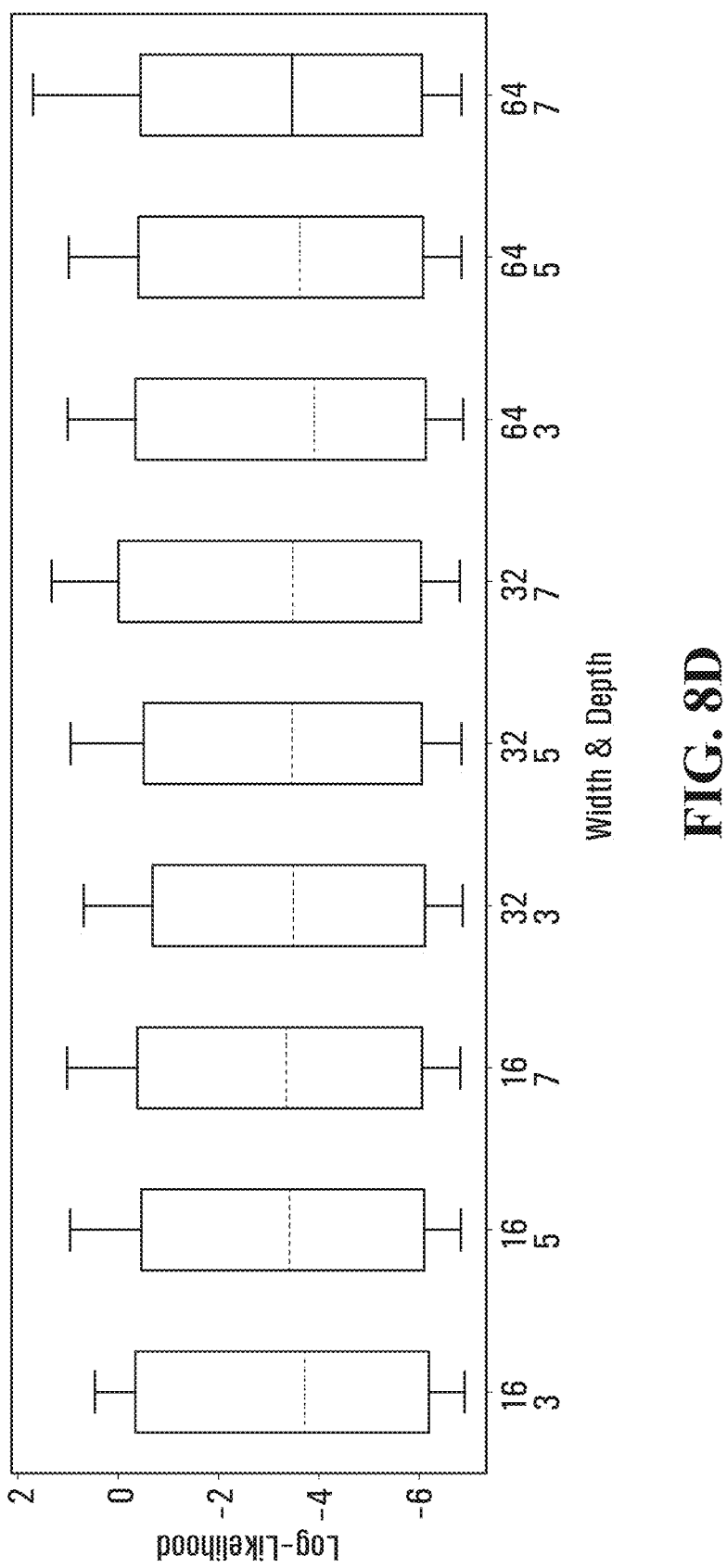
Figure 9A:
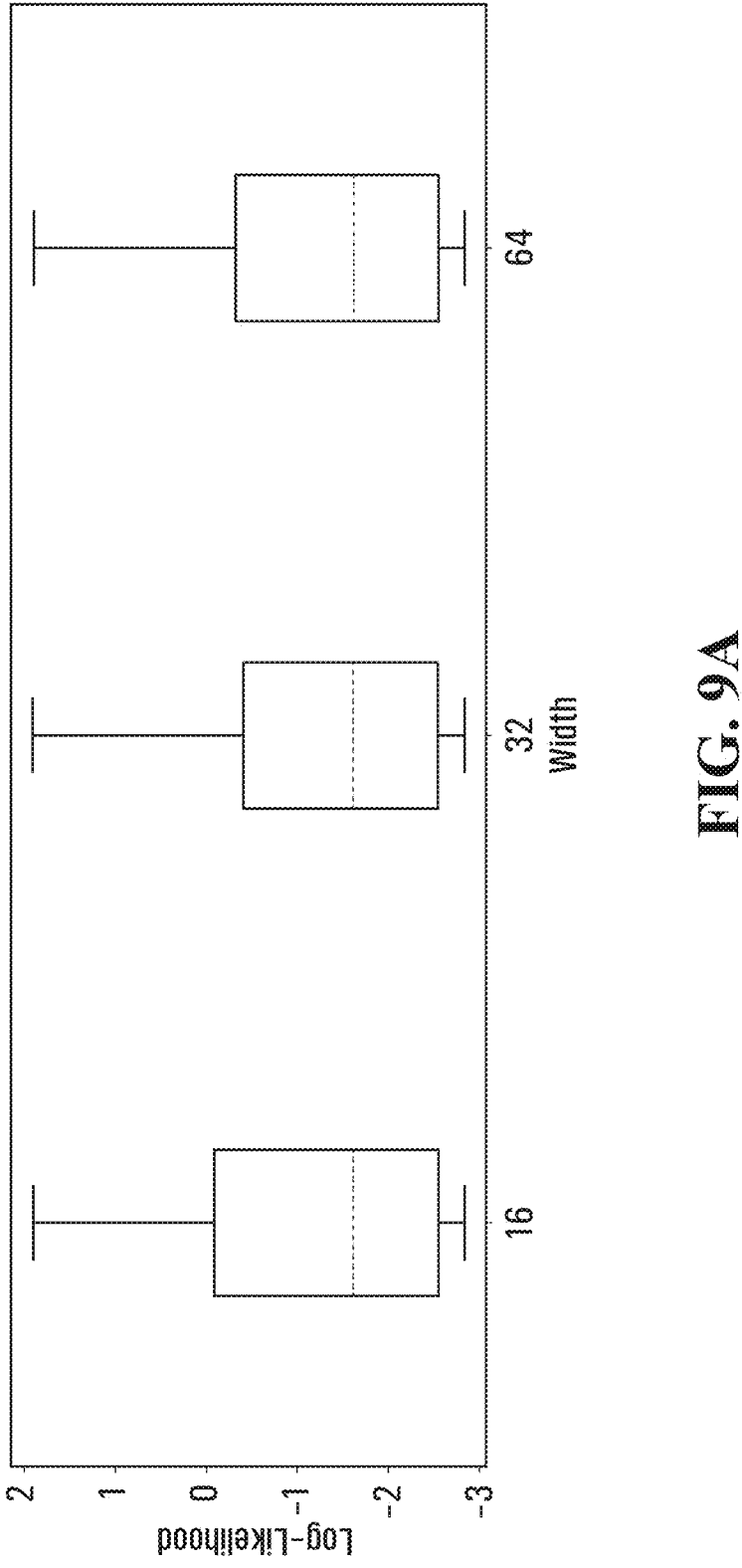
Figure 9B:
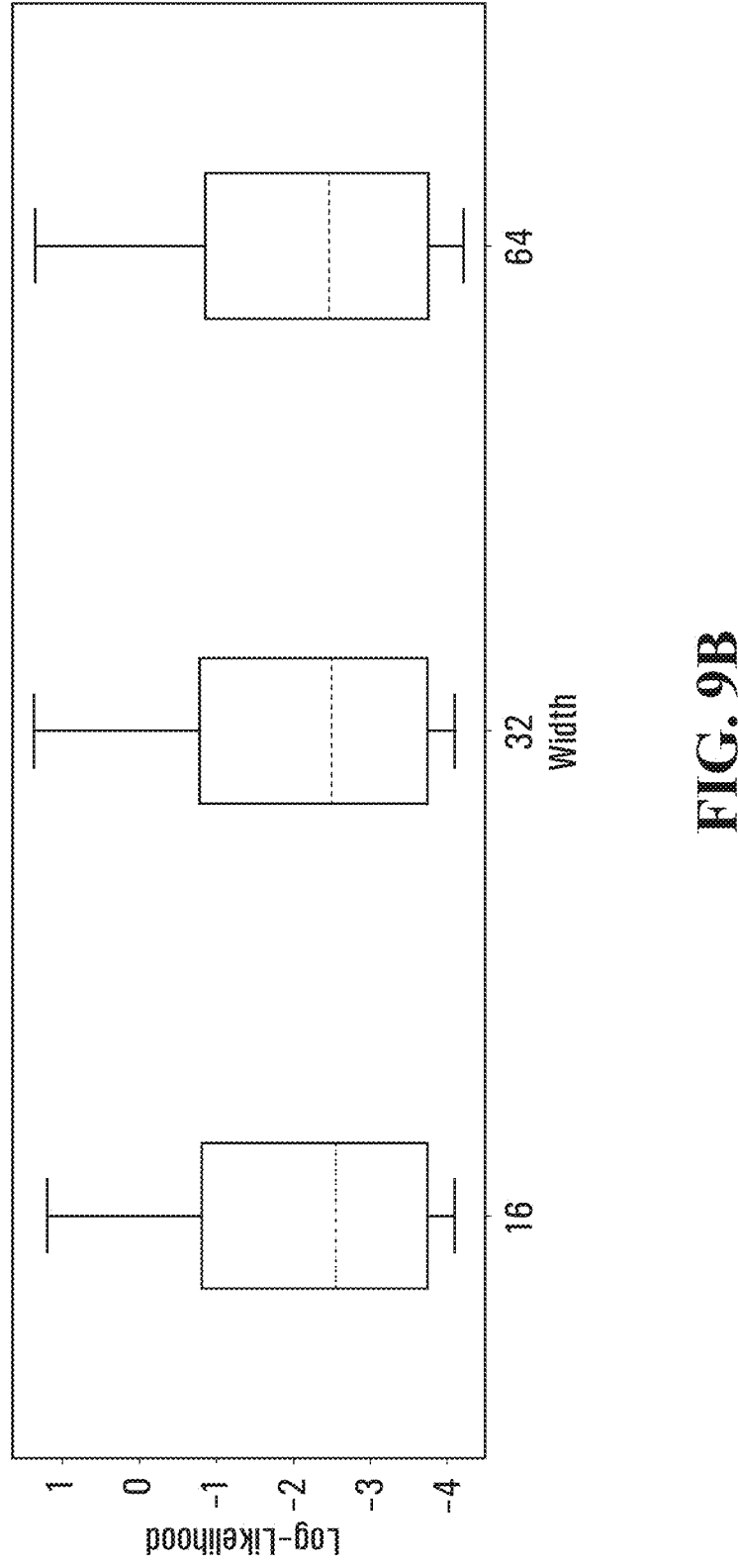
Figure 9C:
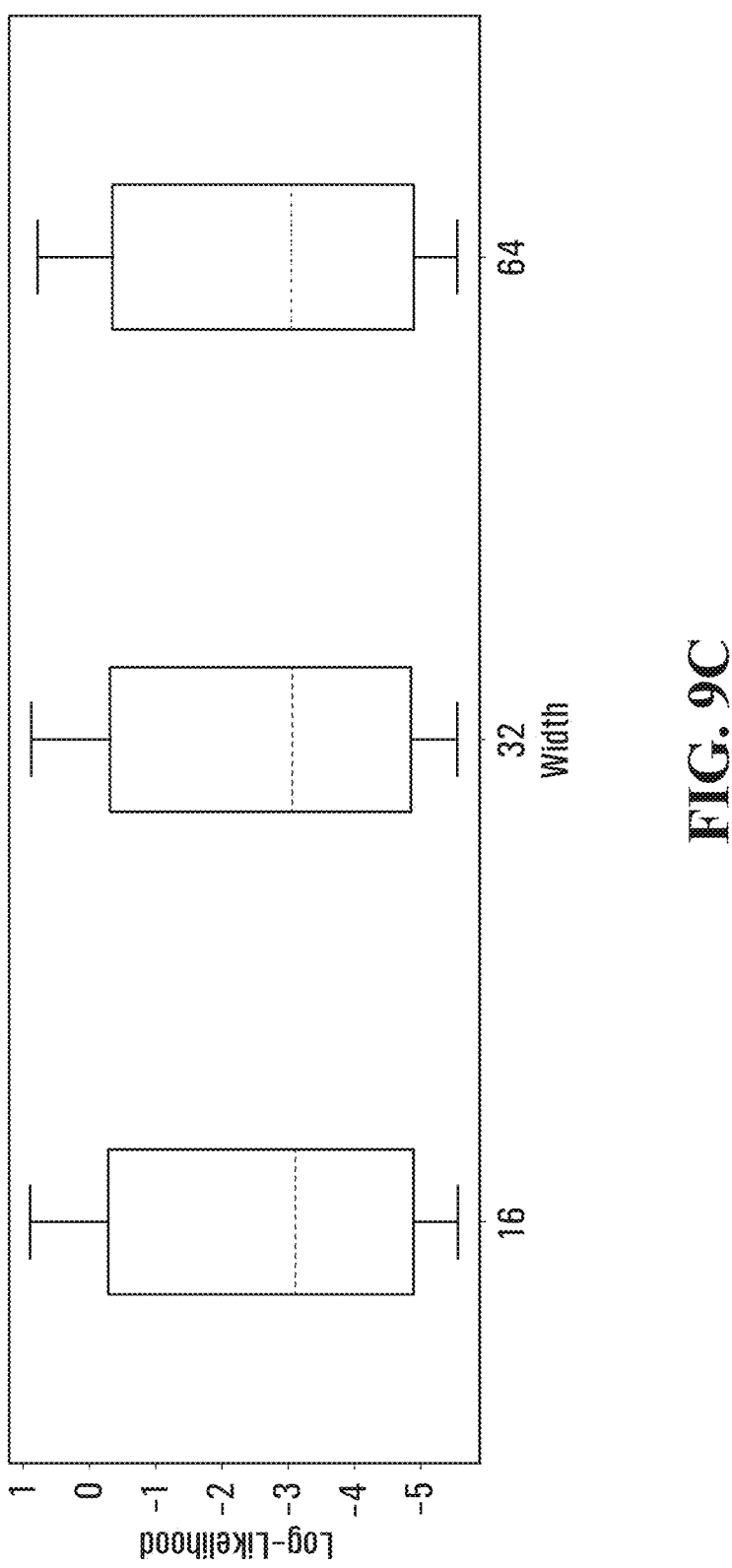
Figure 9D:
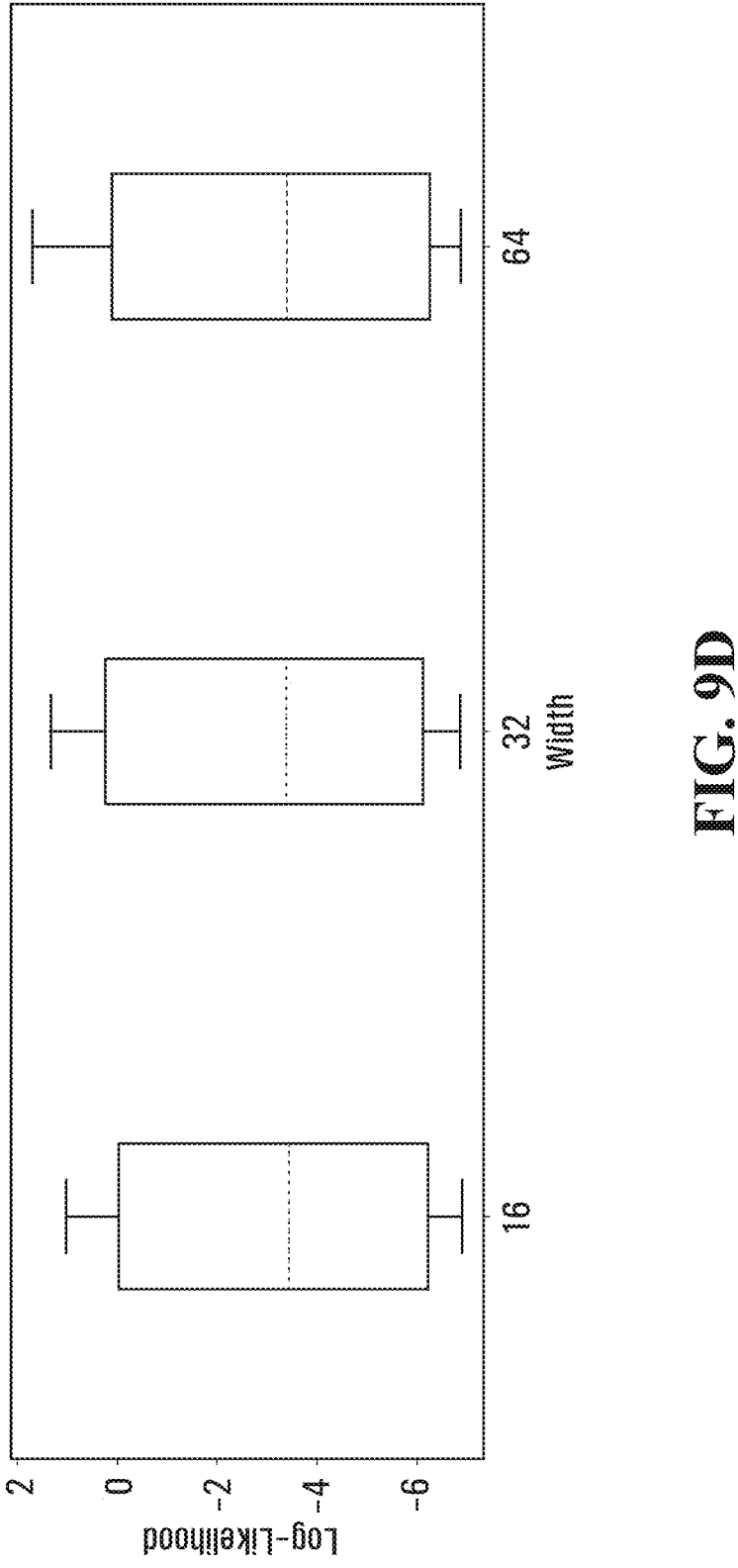
Figure 10A:
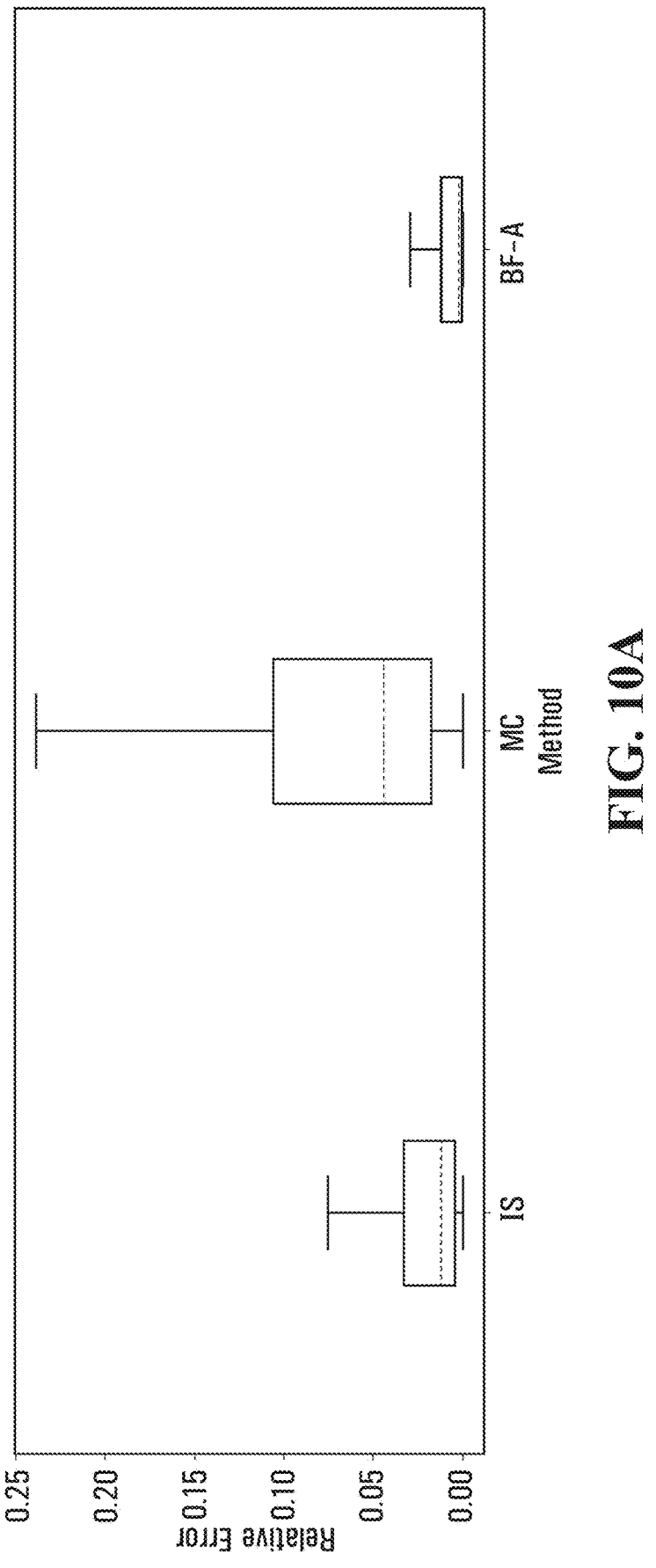
Figure 10B:
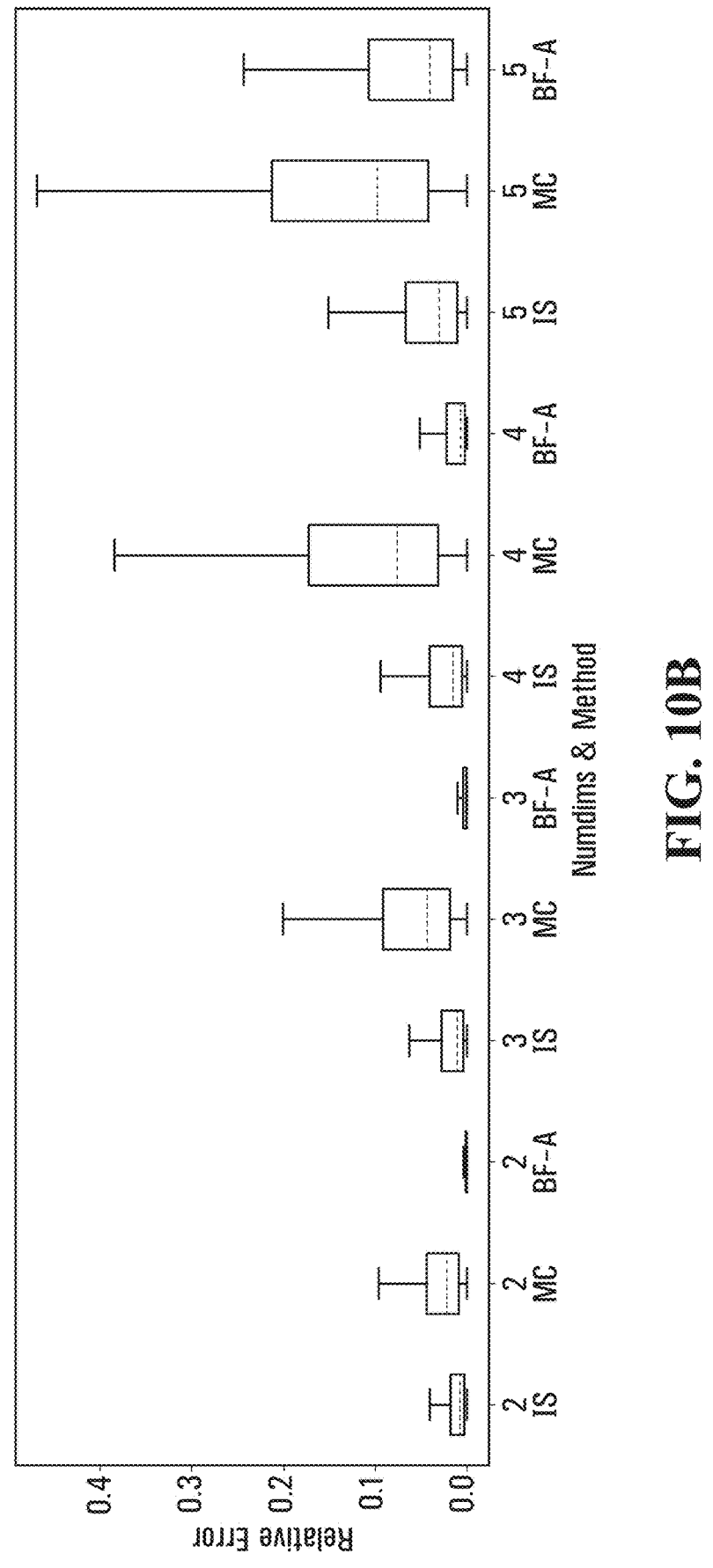
Figure 10C:
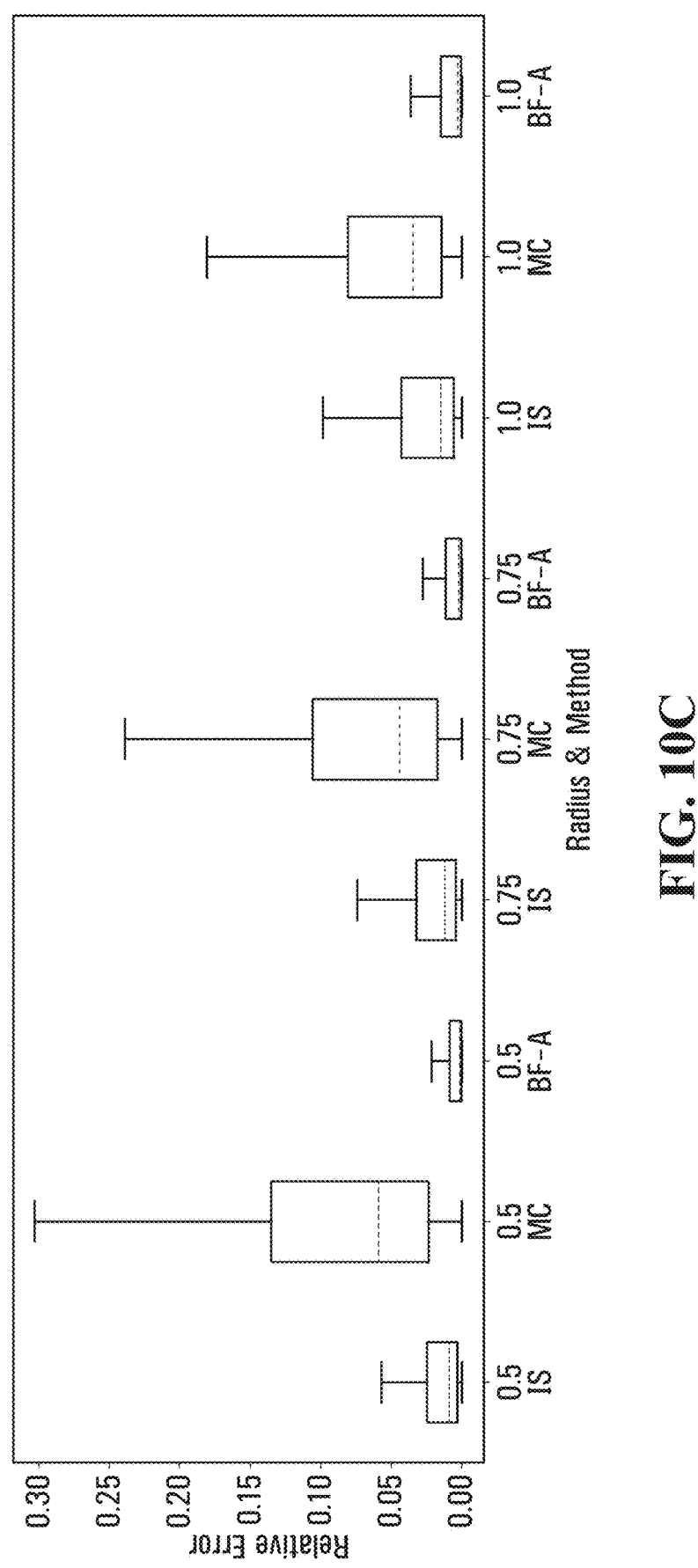
Figure 10D:
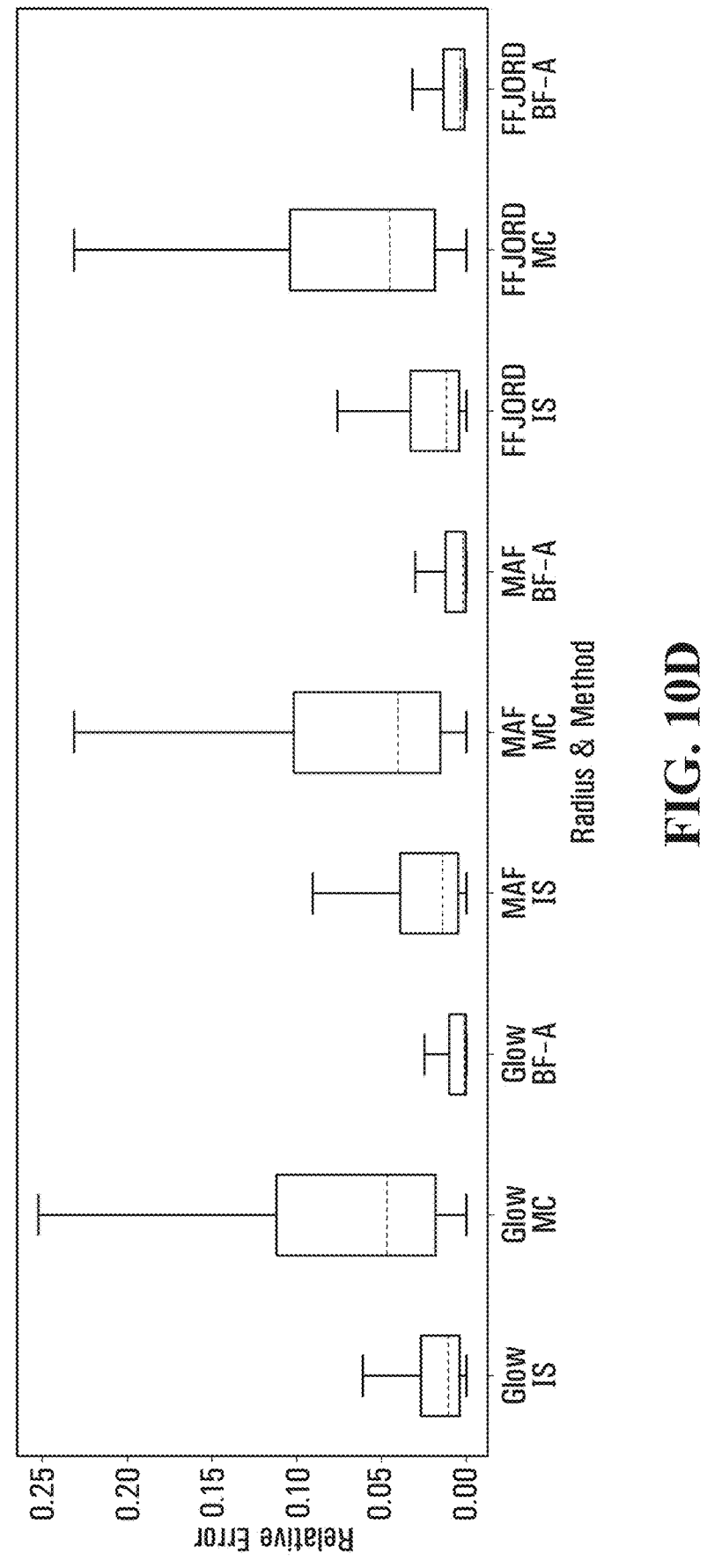

FIGS. 8A, 8B, 8C, 8D, 9A, 9B, 9C and 9D show that both the Continuous and Discrete flows obtain similar log-likelihoods and are able to fit the training data well. FIGS. 8A to 8B each illustrates log-likelihood on discrete flows, for 2D, 3D, 4D and 5D cases, respectively. FIGS. 9A to 9D each illustrates log-likelihood on continuous flows, for 2D, 3D, 4D and 5D cases, respectively.

FIGS. 10A to 10D each illustrates a visual summary of all quantitative evaluations based on varying flow architectures.

Pseudo codes are disclosed below for 1) splitting edges and updating the volume, and 2) getting the volume of a simplex object.

---

Algorithm 1 Split edges and update the volume

---

Objects and Attributes:
    edge: A 1 simplex object in $\mathbb{R}^d$ having the following attribites:
      - endPoints: the endPoints of the edge
      - simplices: set of d − 1-dimensional simplices that contains this edge
    simplex: A d − 1 simplex object in $\mathbb{R}^d$ having the following attribites:
      - edges: the set of edges contained in the simplex
      - unitSurfaceNormal: the unit surface normal of the simplex, adjusted so that it points outwards (or
        towards) of the hull.
      - volume: the volume of the simplex
      - getVolumeElement: a method that will loop through the points and computes the mean dot-product.
Input:
    edgeToSplit: The selected edge to split according to the priority function described in Eq. ▦ .
    edges: Hashmap of Edges
      - Allows $\mathcal{O}(1)$ retrieval of edge objects from the endpoints. If object does not exist in the queue, a
        new one is created and returned.
    volume: The current estimated volume
Outputs:
    newVolume

---

(Initialize the newVolume to be equal to the current volume in the Pesudo code below)

```
 1: newVolume ← volume        ▷ Initialize the newVolume to be equal to the current volume
 2: for simplex in edgeToSplit.simplices do
 3:     simplex1 ← new Simplex( )
 4:     simplex2 ← new Simplex( )
 5:     simplex1.unitSurfaceNormal ← simplex.unitSurfaceNormal
 6:     simplex2.unitSurfaceNormal ← simplex.unitSurfaceNormal
 7:     simplex1.volume ← simplex.volume/2
 8:     simplex2.volume ← simplex.volume/2
 9:     for otherEdge in simplex.edges-{edgeToSplit} do
10:         newEdge1 ← edges.get(otherEdge.endPoint[0],edge.midPoint)
11:         newEdge2 ← edges.get(otherEdge.endPoint[1],edge.midPoint)
12:         if otherEdge.hasEndPoint(edgeToSplit.endPoint[0]) then
13:             otherEdge.add(simplex1)
14:             simplex1.edges.add(otherEdge, newEdge1, newEdge2)
15:         else if otherEdge.hasEndpoint(edgeToSplit.endPoint[1]) then
16:             otherEdge.add(simplex2)
17:             simplex2.edges.add(otherEdge, newEdge1, newEdge2)
18:         else
19:             otherEdge.add(simplex1, simplex2)
20:             newEdge1.add(simplex1, simplex2)
```

-continued

```
21:        newEdge2.add(simplex1, simplex2)
22:        simplex1.edges.add(otherEdge, newEdge1, newEdge2)
23:        simplex2.edges.add(otherEdge, newEdge1, newEdge2)
24:     otherEdge.remove(simplex)
25:     newVolume ← newVolume – simplex.getVolumeElement( )
26:     newVolume ← newVolume + simplex1.getVolumeElement( )
27:     newVolume ← newVolume + simplex2.getVolumeElement( )
28:  return newVolume
```

---

Algorithm 2 getVolumeElement of Simplex Object

```
Objects and Attributes:
        edge: A 1 simplex object in ℝ^d having the following attribites:
           - endPoints: the endPoints of the edge
           - simplices: set of d – 1 simplices that contains this edge
        simplex: A d – 1 simplex object in ℝ^d having the following attributes:
           - edges: the set of edges contained in the simplex
           - unitSurfaceNormal: the unit surface normal of the simplex, adjusted so that it points outwards (or
             inwards) of the hull.
           - volume: the volume of the simplex
           - getVolumeElement: a method that will loop through the points and computes the mean dot-product.
Input:
        simplex: A simplex objoct
        flow: The normalizing flow
        D: Number of dimensions
Output:
     volume
  1: volumeElement ← 0
  2: for point in simplex.points( ) do
  3: volumeElement ← volumeElement + simplex.volume*flow.dotProduct(point.simplex.unitSurfaceNormal)
  4: return volumeElement
```

Embodiments performing the operations for anomaly detection and anomaly scoring provide certain advantages over manually assessing anomalies. For example, in some embodiments, all data points are assessed, which eliminates subjectivity involved in judgement-based sampling, and may provide more statistically significant results than random sampling. Further, the outputs produced by embodiments of system are reproducible and explainable.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the disclosure, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The disclosure provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

REFERENCES

[Abdar et~al. (2021) Abdar, Pourpanah, Hussain, Rezazadegan, Liu, Ghavamzadeh, Fieguth, Cao, Khosravi, Acharya, Makarenkov, and Nahavandi] Moloud Abdar, Farhad Pourpanah, Sadiq Hussain, Dana Rezazadegan, Li Liu, Mohammad Ghavamzadeh, Paul W. Fieguth, Xiaochun Cao, Abbas Khosravi, U. Rajendra Acharya, Vladimir Makarenkov, and Saeid Nahavandi. A Review of Uncertainty Quantification in Deep Learning: Techniques, Applications and Challenges. *Inf. Fusion*, 2021.

[Armstrong (2013)] Mark Anthony Armstrong. *Basic Topology*. Springer Science & Business Media, 2013.

[Botev I'Ecuyer (2015) Botev and I'Ecuyer] Zdravko I Botev and Pierre I'Ecuyer. Efficient Probability Estimation and Simulation of the Truncated Multivariate Student-t Distribution. *Winter Simulation Conference (WSC)*, 2015.

[Botev (2017)] Zdravko I Botev. The Normal Law Under Linear Restrictions: Simulation and Estimation via Minimax Tilting. *Journal of the Royal Statistical Society*, 2017.

[Chilinski Silva (2020) Chilinski and Silva] Pawel M. Chilinski and Ricardo Silva. Neural Likelihoods via Cumulative Distribution Functions. *UAI*, 2020.

[Cundy Ermon (2020) Cundy and Ermon] Chris Cundy and Stefano Ermon. Flexible Approximate Inference via Stratified Normalizing Flows. *UAI*, 2020.

[Cunningham et~al. (2013) Cunningham, Hennig, and Lacoste-Julien] John P. Cunningham, Philipp Hennig, and Simon Lacoste-Julien. Gaussian Probabilities and Expectation Propagation. *JMLR*, 2013.

[Dai Seljak (2021) Dai and Seljak] Biwei Dai and Uros Seljak. Sliced Iterative Normalizing Flows. *ICML Workshop on Invertible Neural Networks, Normalizing Flows, and Explicit Likelihood Models*, 2021.

[Dua Graff (2017) Dua and Graff] Dheeru Dua and Casey Graff. UCI Machine Learning Repository, 2017. URL http://archive.ics.uci.edu/ml.

[Evans (2010)] Lawrence C Evans. Partial Differential Equations. *Graduate Studies in Mathematics*, 2010.

[Genz Bretz (2009) Genz and Bretz] Alan Genz and Frank Bretz. *Computation of Multivariate Normal and T Probabilities*. Springer Science & Business Media, 2009.

[Grathwohl et~al. (2019) Grathwohl, Chen, Bettencourt, Sutskever, and Duvenaud] Will Grathwohl, Ricky T. Q. Chen, Jesse Bettencourt, Ilya Sutskever, and David Duvenaud. FFJORD: Free-Form Continuous Dynamics for Scalable Reversible Generative Models. *ICLR*, 2019.

[Kingma Dhariwal (2018) Kingma and Dhariwal] Diederik P. Kingma and Prafulla Dhariwal. Glow: Generative Flow with Invertible 1×1 Convolutions. *NeurIPS*, 2018.

[Kobyzev et~al. (2020) Kobyzev, Prince, and Brubaker] Ivan Kobyzev, Simon Prince, and Marcus Brubaker. Normalizing Flows: An Introduction and Review of Current Methods. *PAMI*, 2020.

[Lange (1999)] Kenneth Lange. Quadrature Methods. *Numerical Analysis for Statisticians*, 1999.

[Liang et~al. (2020) Liang, Yang, Stoica, Abbeel, Duan, and Chen] Eric Liang, Zongheng Yang, Ion Stoica, Pieter Abbeel, Yan Duan, and Xi Chen. Variable Skipping for Autoregressive Range Density Estimation. *ICML*, 2020.

[Liu et~al. (2019) Liu, Paisley, Kioumourtzoglou, and Coull] Jeremiah Z. Liu, John W. Paisley, Marianthi-Anna Kioumourtzoglou, and Brent A. Coull. Accurate Uncertainty Estimation and Decomposition in Ensemble Learning. *NeurIPS*, 2019.

[Mazaheri et~al. (2020) Mazaheri, Jain, and Bruck] Bijan Mazaheri, Siddharth Jain, and Jehoshua Bruck. Robust Correction of Sampling Bias using Cumulative Distribution Functions. *NeurIPS*, 2020.

[Mehta et~al. (2012) Mehta, Neukirchen, Pfetsch, and Poppensieker] Amit Mehta, Max Neukirchen, Sonja Pfetsch, and Thomas Poppensieker. Managing Market Risk: Today and Tomorrow, 2012.

[Meneguzzo Vecchiato (2004) Meneguzzo and Vecchiato] Davide Meneguzzo and Walter Vecchiato. Copula Sensitivity in Collateralized Debt Obligations and Basket Default Swaps. *Journal of Futures Markets: Futures, Options, and Other Derivative Products*, 2004.

[Minka (2001)] Thomas P. Minka. Expectation Propagation for Approximate Bayesian Inference. *UAI*, 2001.

[Papamakarios et~al. (2017) Papamakarios, Murray, and Pavlakou] George Papamakarios, Iain Murray, and Theo Pavlakou. Masked Autoregressive Flow for Density Estimation. *NeurIPS*, 2017.

[Papamakarios et~al. (2021) Papamakarios, Nalisnick, Rezende, Mohamed, and Lakshminarayanan] George Papamakarios, Eric Nalisnick, Danilo Jimenez Rezende, Shakir Mohamed, and Balaji Lakshminarayanan. Normalizing Flows for Probabilistic Modeling and Inference. *JMLR*, 2021.

[Press et~al. (1988) Press, Teukolsky, Vetterling, and Flannery] William H Press, Saul A Teukolsky, William T Vetterling, and Brian P Flannery. *Numerical Recipes in C.* Cambridge University Press, 1988.

[Richardson et~al. (1997) Richardson, Boudoukh, and Whitelaw] Matthew Richardson, Jacob Boudoukh, and Robert F. Whitelaw. The Best of Both Worlds: A Hybrid Approach to Calculating Value at Risk, 1997.

[Ridgeway Mozer (2018) Ridgeway and Mozer] Karl Ridgeway and Michael C. Mozer. Learning Deep Disentangled Embeddings With the F-Statistic Loss. *NeurIPS,* 2018.

[Sklar (1959)] M Sklar. Fonctions de Répartition á n Dimensions et Leurs Marges. *Publications de i'Institut Statistique de i'Université de Paris,* 1959.

[Sun et~al. (2021) Sun, Lee, and Lee] Wei-Fang Sun, Cheng-Kuang Lee, and Chun-Yi Lee. DFAC Framework: Factorizing the Value Function via Quantile Mixture for Multi-Agent Distributional Q-Learning. *ICML,* 2021.

[Wade (2017)] William Wade. *An Introduction to Analysis.* Pearson, 2017.

The invention claimed is:

1. A computer-implemented system for estimating a Cumulative Distribution Function (CDF), the system comprising:

at least one processor; and memory in communication with said at least one processor storing an CDF Estimator comprising a trained neural network and machine-readable instructions, wherein the instructions, when executed at said at least one processor, cause said system to:

receive input data representing a volume V of a target space indicating a future target event;

compute, using the trained neural network, an estimation of a first flux through a boundary of the volume V;

compute, using the trained neural network, an estimation of a second flux through a boundary of a volume W of a base space based on the estimation of the first flux through the boundary of the volume V;

generate, using the trained neural network, an estimation of a CDF for the volume V based on the second flux through the boundary of the volume W;

compute a probability for the future target event based on the estimated CDF for the volume V; and generate a control command based on the probability for the future target event.

2. The system of claim 1, wherein, during training of the neural network, the instructions when executed at said at least one processor, cause said system to: receive, as training input, historical data representative of past target events and wherein the boundary of the volume V of the target space is defined based in part on the historical data.

3. The system of claim 2, wherein, during training of the neural network, the instructions when executed at said at least one processor, cause said system to: use a model fitting process to generate a Probability Distribution Function (PDF) based on the historical data.

4. The system of claim 3, wherein, during the training of the neural network, one or more weights of the neural network are iteratively updated to improve the estimation of the CDF by selecting points on the boundary of the volume V.

5. The system of claim 1, wherein the estimation of the CDF for the volume V is based on a flux through the transformed boundary of the volume V in the base space.

6. The system of claim 1, wherein the estimation the CDF for the volume V is based on a flux through the untransformed boundary of the volume V in the target space.

7. The system of claim 1, wherein the trained neural network is configured to compute:

$$P(x \in V) = \int_V p_X(x)dx,$$

wherein $P(x \in V)$ is a cumulative density over the volume V, and x represents a random variable with the complex target distribution $p_X(x)$.

8. The system of claim 7, wherein:

$$p_X(x) = p_Y(y) \, \text{abs}\left(\left|\frac{dg}{dx}\right|\right),$$

wherein: $|\cdot|$ is a determinant, abs($\cdot$) denotes absolute value, g is inverse of f, $$\frac{dg}{dx}$$

is (d×d)—Jacobian J of g, x represents the random variable with the complex target distribution $p_X(x)$ using a bijective mapping f: $\mathbb{R}^d \rightarrow \mathbb{R}^d$, y is a random variable with a base distribution $p_Y(y)$.

9. The system of claim 8, wherein $p_Y(y)$ comprises a Gaussian distribution.

10. The system of claim 8, wherein $p_Y(y)$ comprises a uniform distribution.

11. A computer-implemented method for estimating a Cumulative Distribution Function (CDF), the method comprising:

receiving input data representing a volume V of a target space indicating a future target event;

computing, using a trained neural network, an estimation of a first flux through a boundary of the volume V;

computing, using the trained neural network, an estimation of a second flux through a boundary of a volume W of a base space based on the estimation of the first flux through the boundary of the volume V;

generating, using the trained neural network, an estimation of a CDF for the volume V based on the second flux through the boundary of the volume W;

computing a probability for the future target event based on the estimated CDF for the volume V; and generating a control command based on the probability for the future target event.

12. The method of claim 11, wherein, during training of the neural network, historical data representative of past target events are used as training input, and wherein the boundary of the volume V of the target space is defined based in part on the historical data.

13. The method of claim 12, wherein method comprises: using a model fitting process to generate a Probability Distribution Function (PDF) based on the historical data.

14. The method of claim 13, wherein during the training of the neural network, one or more weights of the neural network are iteratively updated to improve the estimation of the CDF by selecting points on the boundary of the volume V.

15. The method of claim 11, wherein the estimation of the CDF for the volume V is based on a flux through the transformed boundary of the volume V in the base space.

16. The method of claim 11, wherein the estimation the CDF for the volume V is based on a flux through the untransformed boundary of the volume V in the target space.

17. The method of claim 11, wherein:

$$P(x \in V) = \int p_X(x)dx,$$

wherein $P(x \in V)$ is a cumulative density over the volume V, and x represents a random variable with the complex target distribution $p_X(x)$.

18. The method of claim 17, wherein:

$$p_X(x) = p_Y(y) \ \mathrm{abs}\left(\left|\frac{dg}{dx}\right|\right),$$

wherein: $|\cdot|$ is a determinant, $\mathrm{abs}(\cdot)$ denotes absolute value, g is inverse of f, $$\frac{dg}{dx}$$

is (d×d)—Jacobian J of g, x represents the random variable with the complex target distribution $p_X(x)$ using a bijective mapping f: $\mathbb{R}^d \rightarrow \mathbb{R}^d$, y is a random variable with a base distribution $p_Y(y)$.

19. The method of claim 18, wherein $p_Y(y)$ comprises a Gaussian distribution.

20. The method of claim 18, wherein $p_Y(y)$ comprises a uniform distribution.

* * * * *